(12) United States Patent
Claude et al.

(10) Patent No.: US 6,787,933 B2
(45) Date of Patent: Sep. 7, 2004

(54) POWER GENERATION SYSTEM HAVING TRANSIENT RIDE-THROUGH/LOAD-LEVELING CAPABILITIES

(75) Inventors: Khalizadeh Claude, San Ramone, CA (US); Wacknov Joel, Thousand Oaks, CA (US)

(73) Assignee: Capstone Turbine Corporation, Chatsworth, CA (US)

(*) Notice: Subject to any disclaimer, the term of this patent is extended or adjusted under 35 U.S.C. 154(b) by 59 days.

(21) Appl. No.: 10/043,694

(22) Filed: Jan. 10, 2002

(65) Prior Publication Data

US 2003/0015873 A1 Jan. 23, 2003

Related U.S. Application Data

(60) Provisional application No. 60/260,961, filed on Jan. 10, 2001.

(51) Int. Cl.[7] .................................................. H02P 9/00
(52) U.S. Cl. ............................................ 290/52; 322/27
(58) Field of Search ............................ 290/41, 52, 40 C; 322/27

(56) References Cited

U.S. PATENT DOCUMENTS

| 2,864,244 | A | 12/1958 | Prachar |
| 3,124,924 | A | 3/1964 | Smith |
| 3,250,973 | A | 5/1966 | Dawson |

(List continued on next page.)

FOREIGN PATENT DOCUMENTS

| DE | 3634328 | 4/1987 |
| DE | 19704662 | 8/1998 |
| EP | 0 472 294 | 2/1992 |
| EP | 0 679 800 | 11/1995 |
| EP | 0 837 231 | 4/1998 |
| EP | 0 901 218 | 3/1999 |
| FR | 1453862 | 4/1965 |
| FR | 2395316 | 1/1979 |
| JP | 52-60924 | 5/1977 |
| WO | WO 94/27359 | 11/1994 |
| WO | WO 98/25014 | 6/1998 |
| WO | WO 99/32762 | 7/1999 |
| WO | WO 99/52193 | 10/1999 |
| WO | WO 00/28191 | 5/2000 |

OTHER PUBLICATIONS

US 6,512,306, 1/2003, Gilbreth et al. (withdrawn)*
Japanese Patent Abstract entitled "Method and Equipment for Controlling Permanent Magnet Turbine Generator/Motor"; filed May 13, 1999, Japanese Application No. 11-133003.
Japanese Patent Abstract entitled "Command and Control System Method for Multiturbo Generators", filed Oct. 27, 1999, Japanese Application No. 11-305375.
Japanese Patent Abstract entitled "Turbine Generator-Motor Controller", filed Aug. 4, 1998, Japanese Application No. 10-220231.

(List continued on next page.)

Primary Examiner—Nicholas Ponomarenko
(74) Attorney, Agent, or Firm—Sterne, Kessler, Goldstein & Fox P.L.L.C.

(57) ABSTRACT

A power generation system includes a turbogenerator having a motor/generator and a turbine coupled to a common shaft, and generates AC power. A first power converter is coupled to the turbogenerator and a DC bus and converts the AC power to DC power on the DC bus. A second power converter is coupled to the DC bus and is couple-able to a load. The second power converter converts the DC power on the DC bus to an output power for coupling to the load. Also coupled to the DC bus are a battery and a capacitor to stabilize a DC voltage on the DC bus during load changes. The power generation system further includes a power controller coupled to the turbogenerator and the first and second power converters. The power controller regulates a speed of the turbine, independent of the DC voltage on the DC bus.

39 Claims, 23 Drawing Sheets

U.S. PATENT DOCUMENTS

| | | |
|---|---|---|
| 3,569,809 A | 3/1971 | Comer |
| 3,591,844 A | 7/1971 | Schonebeck |
| 3,703,076 A | 11/1972 | Hagemeister |
| 3,724,214 A | 4/1973 | Bryant |
| 3,764,815 A | 10/1973 | Habock et al. |
| 3,809,914 A | 5/1974 | Kilgore et al. |
| 3,829,758 A | 8/1974 | Studtmann |
| 3,937,974 A | 2/1976 | Lafuze |
| 3,991,357 A | 11/1976 | Kaminski |
| 4,005,581 A | 2/1977 | Aanstad |
| 4,015,187 A | 3/1977 | Sasaki et al. |
| 4,039,914 A | 8/1977 | Steigerwald et al. |
| 4,093,869 A | 6/1978 | Hoffmann et al. |
| 4,119,861 A | 10/1978 | Gocho |
| 4,258,424 A | 3/1981 | Giras et al. |
| 4,265,099 A | 5/1981 | Johnson et al. |
| 4,292,534 A | 9/1981 | Diegel et al. |
| 4,340,820 A | 7/1982 | Meyer-Pittroff et al. |
| 4,401,938 A | 8/1983 | Cronin |
| 4,442,385 A | 4/1984 | Van Sickle |
| 4,471,229 A | 9/1984 | Plohn et al. |
| 4,481,459 A | 11/1984 | Mehl et al. |
| 4,498,551 A | 2/1985 | Arbisi |
| 4,551,980 A | 11/1985 | Bronicki |
| 4,560,364 A | 12/1985 | Cohen |
| 4,565,957 A | 1/1986 | Gary et al. |
| 4,684,814 A | 8/1987 | Radomski |
| 4,709,318 A | 11/1987 | Gephart et al. |
| 4,719,550 A | 1/1988 | Powell et al. |
| 4,730,397 A | 3/1988 | Weiford et al. |
| 4,754,607 A | 7/1988 | Mackay |
| 4,757,686 A | 7/1988 | Kawamura et al. |
| 4,772,802 A | 9/1988 | Glennon et al. |
| 4,786,852 A | 11/1988 | Cook |
| 4,802,882 A | 2/1989 | Heidrich |
| 4,830,412 A | 5/1989 | Raad et al. |
| 4,833,887 A | 5/1989 | Kawamura et al. |
| 4,841,216 A | 6/1989 | Okada et al. |
| 4,862,009 A | 8/1989 | King |
| 4,883,973 A | 11/1989 | Lakey et al. |
| 4,908,565 A | 3/1990 | Cook et al. |
| 4,939,441 A | 7/1990 | Dhyanchand |
| 4,955,199 A | 9/1990 | Kawamura |
| 4,967,096 A | 10/1990 | Diemer et al. |
| 4,968,926 A | 11/1990 | Dhyanchand |
| 4,982,569 A | 1/1991 | Bronicki |
| 5,013,929 A | 5/1991 | Dhyanchand |
| 5,015,941 A | 5/1991 | Dhyanchand |
| 5,029,062 A | 7/1991 | Capel |
| 5,038,566 A | 8/1991 | Hara |
| 5,055,764 A | 10/1991 | Rozman et al. |
| 5,057,763 A | 10/1991 | Torii et al. |
| 5,068,590 A | 11/1991 | Glennon et al. |
| 5,088,286 A | 2/1992 | Muraji |
| 5,097,195 A | 3/1992 | Raad et al. |
| 5,115,183 A | 5/1992 | Kyoukane et al. |
| 5,158,504 A | 10/1992 | Stocco |
| 5,191,520 A | 3/1993 | Eckersley |
| 5,214,371 A | 5/1993 | Naidu |
| 5,237,260 A | 8/1993 | Takakado et al. |
| 5,250,890 A | 10/1993 | Tanamachi et al. |
| 5,252,860 A | 10/1993 | McCarty et al. |
| 5,260,637 A | 11/1993 | Pizzi |
| 5,281,905 A | 1/1994 | Dhyanchand et al. |
| 5,291,106 A | 3/1994 | Murty et al. |
| 5,309,081 A | 5/1994 | Shah et al. |
| 5,325,043 A | 6/1994 | Parro |
| 5,345,154 A | 9/1994 | King |
| 5,363,032 A | 11/1994 | Hanson et al. |
| 5,364,309 A | 11/1994 | Heidrich et al. |
| 5,373,195 A | 12/1994 | De Doncker et al. |
| 5,381,081 A | 1/1995 | Radun |
| 5,387,859 A | 2/1995 | Murugan et al. |
| 5,404,092 A | 4/1995 | Gegner |
| 5,406,797 A | 4/1995 | Kawamura |
| 5,428,275 A | 6/1995 | Carr et al. |
| 5,430,362 A | 7/1995 | Carr et al. |
| 5,477,091 A | 12/1995 | Fiorina et al. |
| 5,488,286 A | 1/1996 | Rozman et al. |
| 5,495,162 A | 2/1996 | Rozman et al. |
| 5,495,163 A | 2/1996 | Rozman et al. |
| 5,510,696 A | 4/1996 | Naidu et al. |
| 5,512,811 A | 4/1996 | Latos et al. |
| 5,544,484 A | 8/1996 | Voss et al. |
| 5,545,090 A | 8/1996 | Kirschey |
| 5,546,742 A | 8/1996 | Shekhawat et al. |
| 5,550,410 A | 8/1996 | Titus |
| 5,550,455 A | 8/1996 | Baker |
| 5,559,421 A | 9/1996 | Miyakawa |
| 5,563,802 A | 10/1996 | Plahn et al. |
| 5,568,023 A | 10/1996 | Grayer et al. |
| 5,572,108 A | 11/1996 | Windes |
| 5,581,168 A | 12/1996 | Rozman et al. |
| 5,587,647 A | 12/1996 | Bansal et al. |
| 5,594,322 A | 1/1997 | Rozman et al. |
| 5,637,987 A | 6/1997 | Fattic et al. |
| 5,646,458 A | 7/1997 | Bowyer et al. |
| 5,656,915 A | 8/1997 | Eaves |
| 5,743,227 A | 4/1998 | Jacquet et al. |
| 5,767,637 A | 6/1998 | Lansberry |
| 5,789,881 A | 8/1998 | Egami et al. |
| 5,799,484 A | 9/1998 | Nims |
| 5,819,524 A | 10/1998 | Bosley et al. |
| 5,847,522 A | 12/1998 | Barba |
| 5,903,116 A | 5/1999 | Geis et al. |
| 5,905,346 A | 5/1999 | Yamada et al. |
| 5,929,537 A | 7/1999 | Glennon |
| 5,936,312 A | 8/1999 | Koide et al. |
| 5,939,794 A | 8/1999 | Sakai et al. |
| 5,946,086 A | 8/1999 | Bruce |
| 5,982,645 A | 11/1999 | Levran et al. |
| 5,998,976 A | 12/1999 | Steffan |
| 6,005,297 A | 12/1999 | Sasaki et al. |
| 6,020,713 A | 2/2000 | Geis et al. |
| 6,023,135 A | 2/2000 | Gilbreth et al. |
| 6,031,294 A | 2/2000 | Geis et al. |
| 6,051,951 A | 4/2000 | Arai et al. |
| 6,054,776 A | 4/2000 | Sumi |
| 6,064,122 A | 5/2000 | McConnell |
| 6,087,734 A | 7/2000 | Maeda et al. |
| 6,093,975 A * | 7/2000 | Peticolas ..................... 290/52 |
| 6,107,775 A | 8/2000 | Rice et al. |
| 6,147,414 A | 11/2000 | McConnell et al. |
| 6,153,942 A | 11/2000 | Roseman et al. |
| 6,169,332 B1 | 1/2001 | Taylor et al. |
| 6,169,334 B1 | 1/2001 | Edelman |
| 6,175,210 B1 | 1/2001 | Schwartz et al. |
| 6,194,794 B1 | 2/2001 | Lampe et al. |
| 6,230,494 B1 * | 5/2001 | Botti et al. ................... 60/649 |
| 6,265,786 B1 * | 7/2001 | Bosley et al. ................ 290/52 |
| 6,274,945 B1 * | 8/2001 | Gilbreth et al. .............. 290/52 |
| 6,281,596 B1 * | 8/2001 | Gilbreth et al. .............. 290/52 |
| 6,281,601 B1 * | 8/2001 | Edelman et al. .............. 307/29 |
| 6,325,142 B1 * | 12/2001 | Bosley et al. ................ 166/53 |
| 6,355,987 B1 * | 3/2002 | Bixel ........................... 290/52 |
| 6,410,992 B1 * | 6/2002 | Wall et al. ................... 290/52 |
| 6,487,096 B1 | 11/2002 | Gilbreth et al. |
| 6,495,929 B2 * | 12/2002 | Bosley et al. ................ 290/52 |
| 6,552,440 B2 * | 4/2003 | Gilbreth et al. .............. 290/52 |
| 2001/0030425 A1 * | 10/2001 | Gilbreth et al. .............. 290/52 |
| 2001/0052704 A1 * | 12/2001 | Bosley et al. ................ 290/52 |

| | | | |
|---|---|---|---|
| 2002/0005643 A1 * | 1/2002 | Gilbreth et al. | 290/52 |
| 2002/0030364 A1 * | 3/2002 | Bosley et al. | 290/7 |
| 2002/0059791 A1 * | 5/2002 | Willis et al. | 60/39.094 |
| 2002/0070557 A1 * | 6/2002 | Geis | 290/40 R |
| 2002/0074804 A1 * | 6/2002 | Gilbreth et al. | 290/52 |
| 2002/0140234 A1 * | 10/2002 | Wall et al. | 290/52 |
| 2002/0175522 A1 * | 11/2002 | Wacknov et al. | 290/52 |
| 2002/0195821 A1 * | 12/2002 | Wacknov | 290/12 |

OTHER PUBLICATIONS

German Patent Abstract entitled "Control Circuit for Turbine AC Motor–Generator"; for DE 3634328 (Apr. 1987).

German Patent Abstract entitled "Load Symmetrising e.g. for Several Power Supply Modules Including Rectifier Modules"; for DE 19704662 (Aug. 1998).

French Patent Abstract entitled "Control System for Turbine Driven by Blast Furnace Throat Gas"; for FR 2395316 (Jan. 1979).

Japanese Patent Abstract entitled "Control Circuit in Permanent Magnet Motor"; for JP Publication No. 52–60924 (May 1977).

* cited by examiner

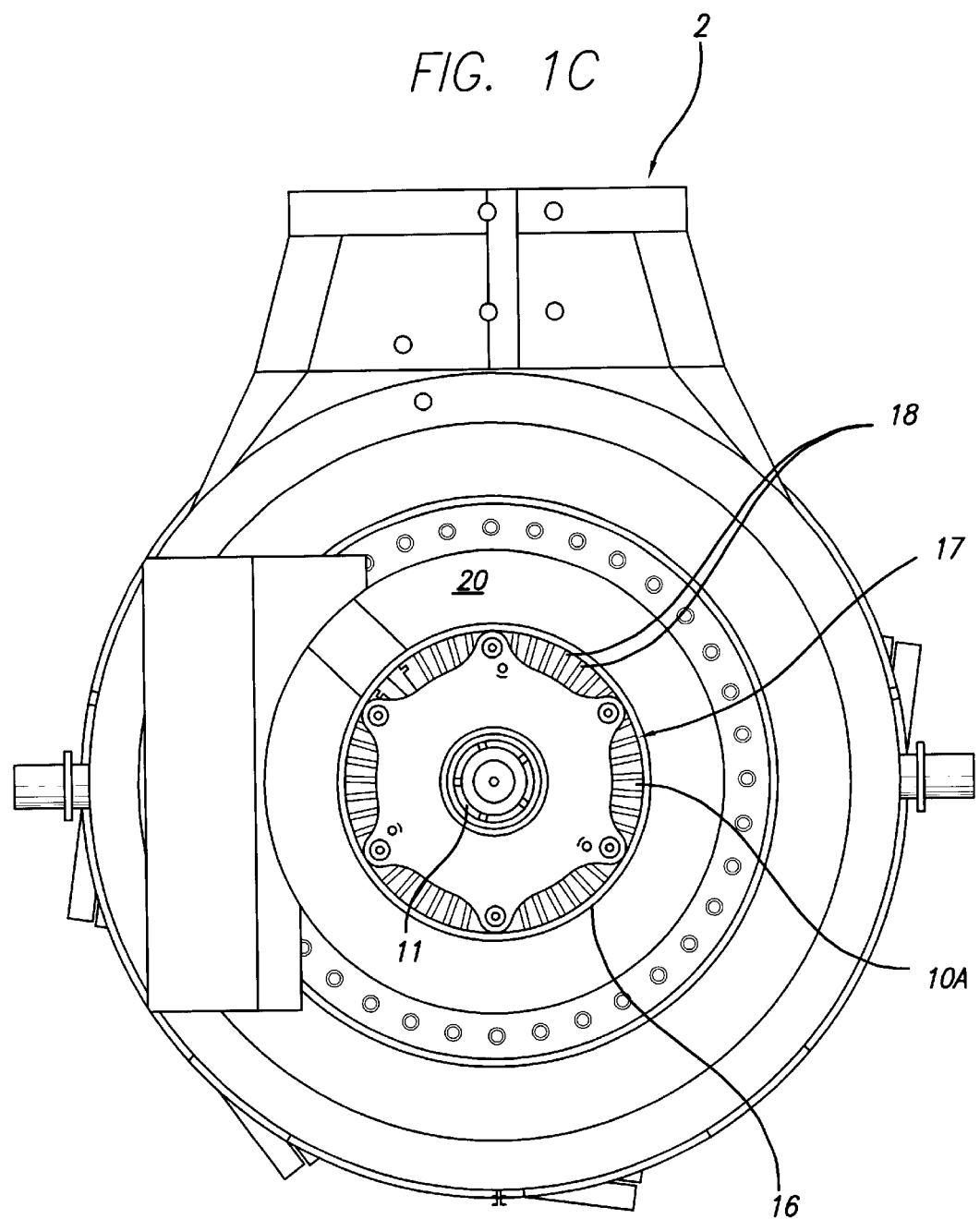

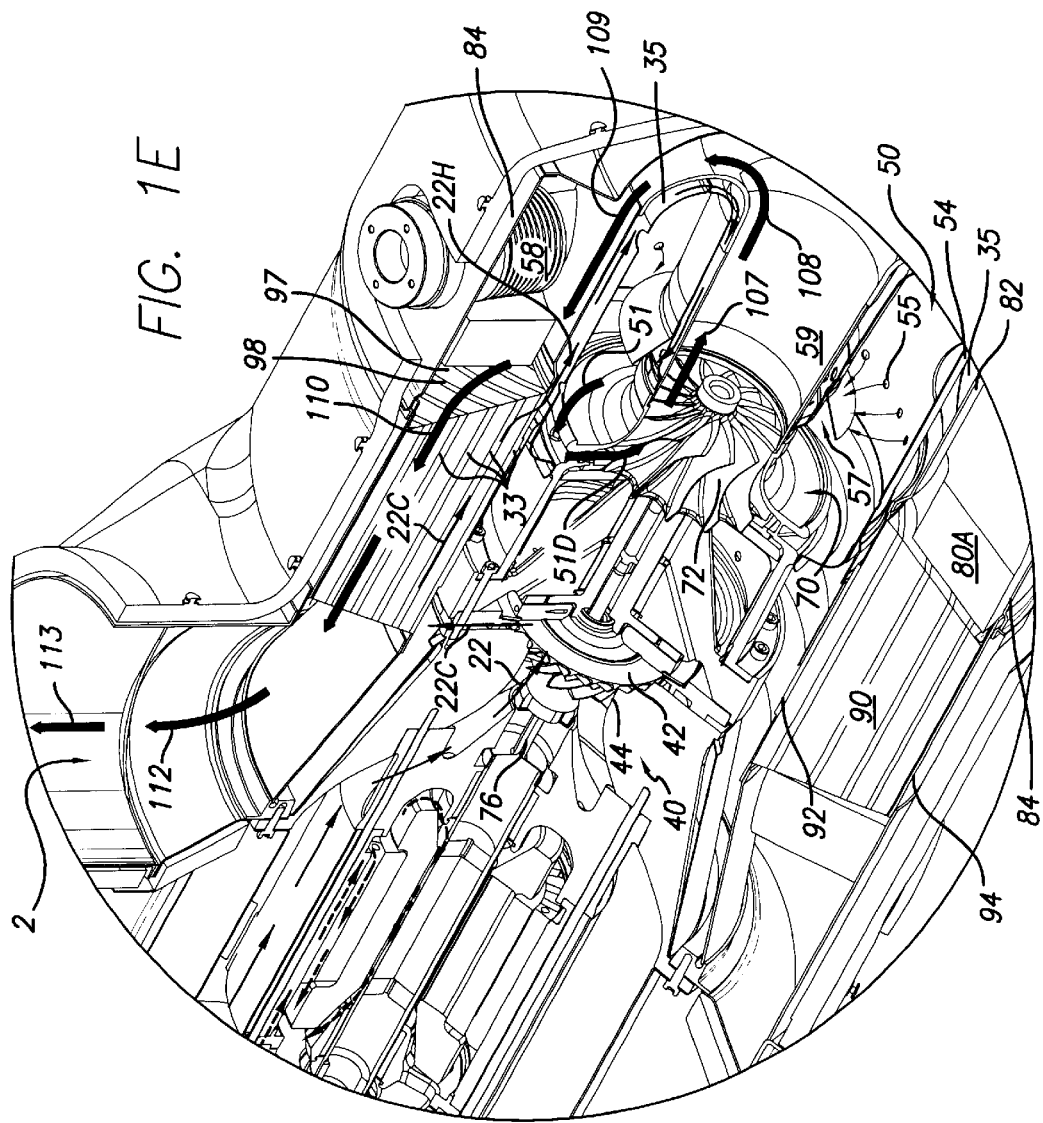

POWER GENERATION SYSTEM HAVING TRANSIENT RIDE-THROUGH/LOAD-LEVELING CAPABILITIES

CROSS REFERENCE TO RELATED APPLICATIONS

This application is a continuation-in-part application of U.S. patent application Ser. No. 09/207,817, filed Dec. 8, 1998, (now U.S. Pat. No. 6,487,096) and this application claims the benefit of U.S. Provisional Application Ser. No. 60/260,961, filed on Jan. 10, 2001, the contents of which are fully incorporated herein by reference.

BACKGROUND OF THE INVENTION

1. Field of the Invention

This invention relates generally to power generation, distribution and processing systems and in particular to a transient ride-through or load leveling power generation and distribution system.

2. Background of the Invention

Conventional power generation and distribution systems are configured to maximize the specific hardware used. In the case of a conventional turbogenerator, for example, the output or bus voltage varies with the speed of the turbine engine. In such systems, the turbine speed must be regulated to control the output or bus voltage, making it less efficient.

The assignee of the present disclosure has designed and developed efficient microturbines for a myriad of applications including power grid and stand-alone applications, to name a few. While these microturbines yield very low emissions and high thermal efficiency, they may have a slow transient response to certain load changes.

SUMMARY OF THE INVENTION

A power generation system is disclosed. In one embodiment, the power generation system includes a turbogenerator that includes a motor/generator and a turbine coupled to a common shaft and generates AC power. A first power converter is coupled to the turbogenerator and a DC bus and converts the AC power to DC power on the DC bus. A second power converter is coupled to the DC bus and is couple-able to a load. The second power converter converts the DC power on the DC bus to an output power for coupling to the load. Also coupled to the DC bus are a battery and a capacitor to stabilize a DC voltage on the DC bus during load changes. The power generation system further includes a power controller coupled to the turbogenerator and the first and second power converters. The power controller regulates a speed of the turbine, independent of the DC voltage on the DC bus.

Other embodiments are disclosed and claimed herein.

BRIEF DESCRIPTION OF THE DRAWINGS

FIG. 1C is an end view, from the motor/generator end, of the integrated turbogenerator of FIG. 1A.

FIG. 1E is a magnified perspective view, partially in section, of the compressor-turbine portion of the integrated turbogenerator of FIG. 1A.

DETAILED DESCRIPTION

Mechanical Structural Embodiment of a Turbogenerator

Figure 1A:
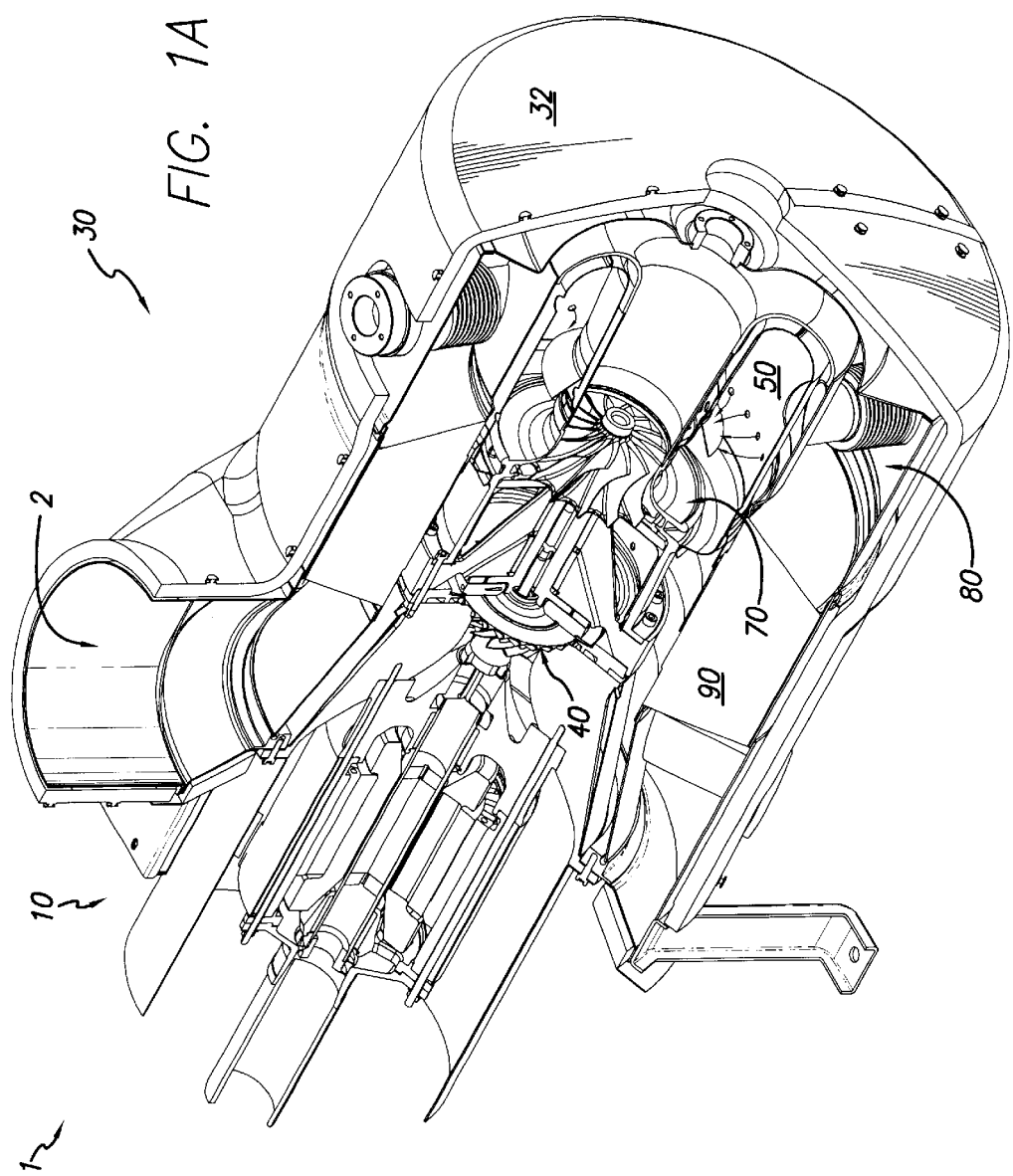
FIG. 1A is perspective view, partially in section, of an integrated turbogenerator system.

With reference to FIG. 1A, an integrated turbogenerator 1 according to the present disclosure generally includes motor/generator section 10 and compressor-turbine section 30. Compressor-turbine section 30 includes exterior can 32, compressor 40, combustor 50 and turbine 70. A recuperator 90 may be optionally included.

Figure 1B:
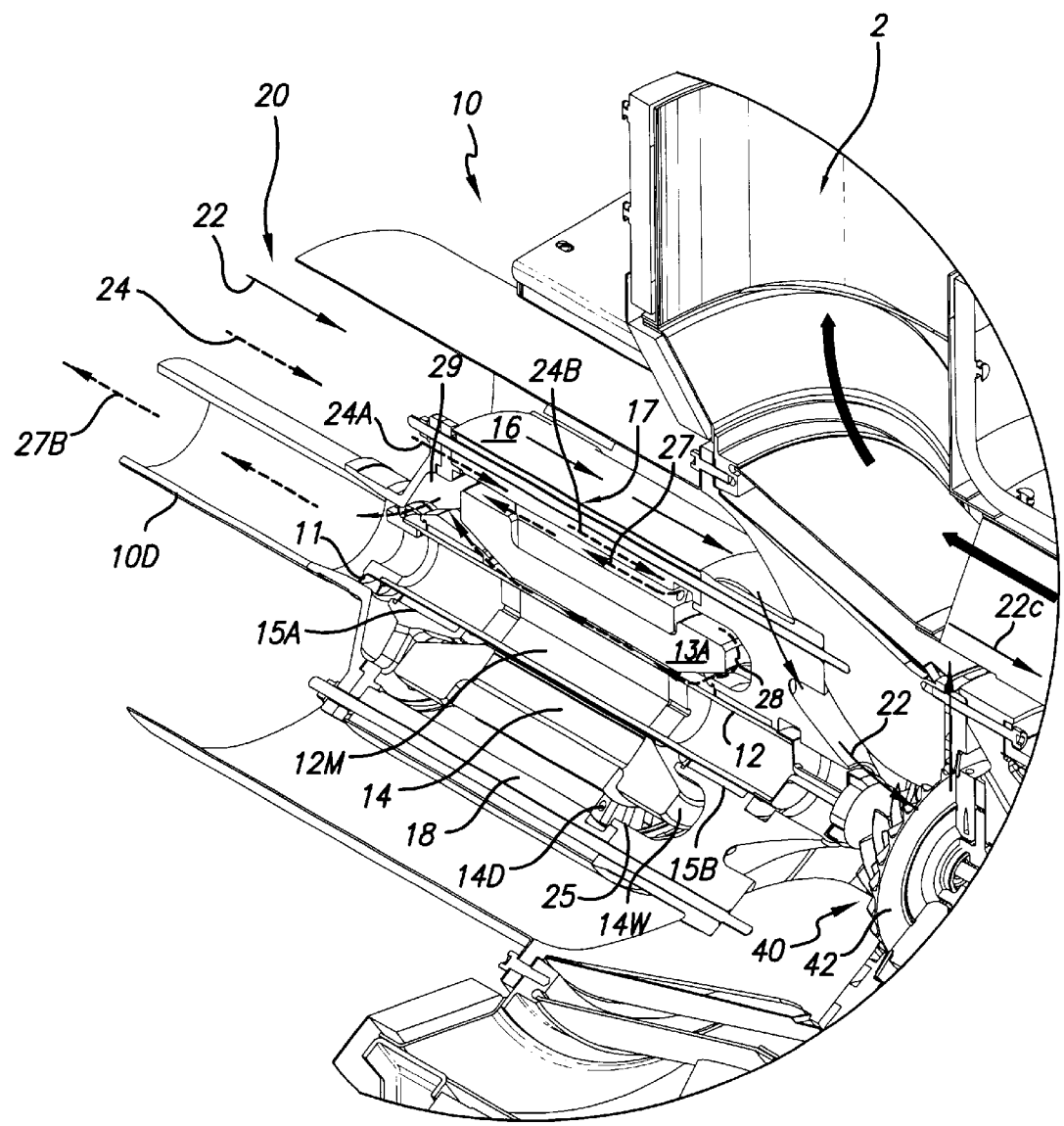
FIG. 1B is a magnified perspective view, partially in section, of the motor/generator portion of the integrated turbogenerator of FIG. 1A.

Referring now to FIG. 1B and FIG. 1C, in a currently preferred embodiment of the present disclosure, motor/generator section 10 may be a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
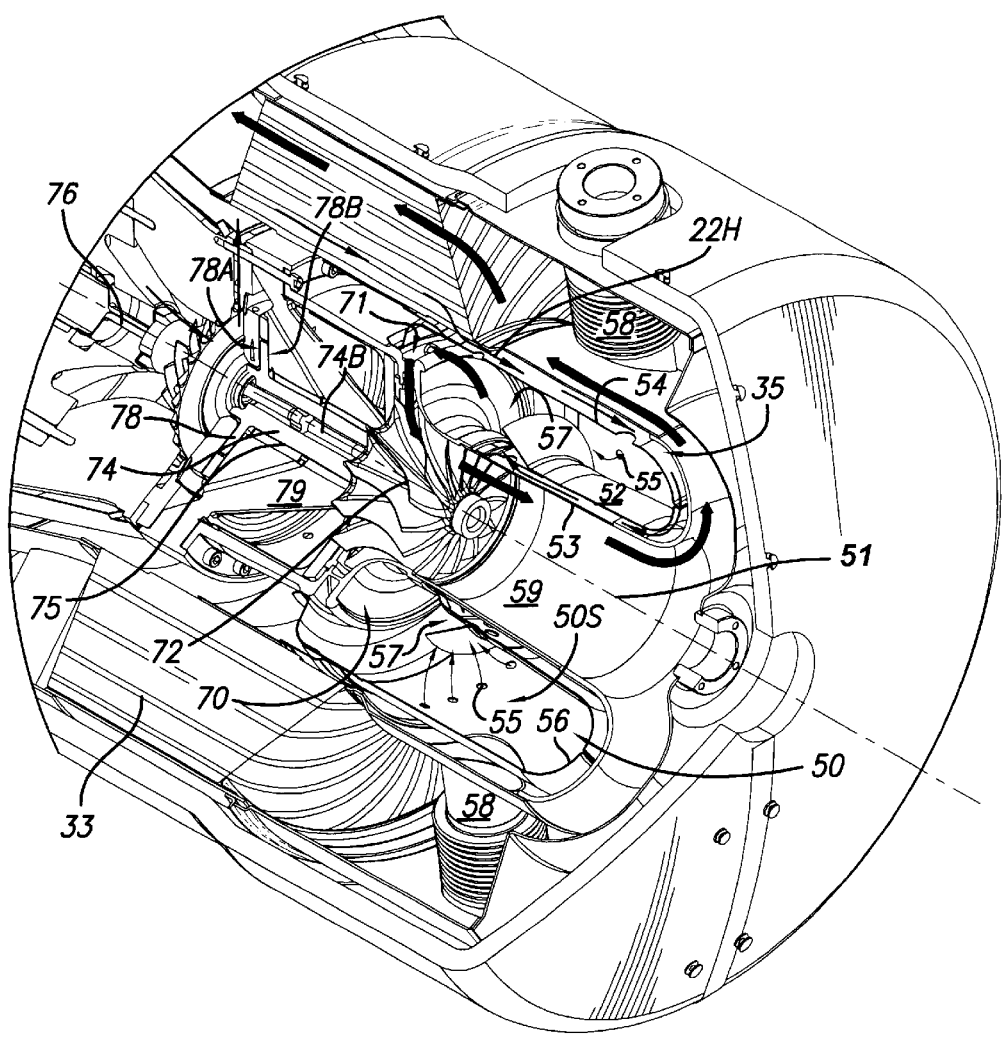
FIG. 1D is a magnified perspective view, partially in section, of the combustor-turbine exhaust portion of the integrated turbogenerator of FIG. 1A.
Figure 2:
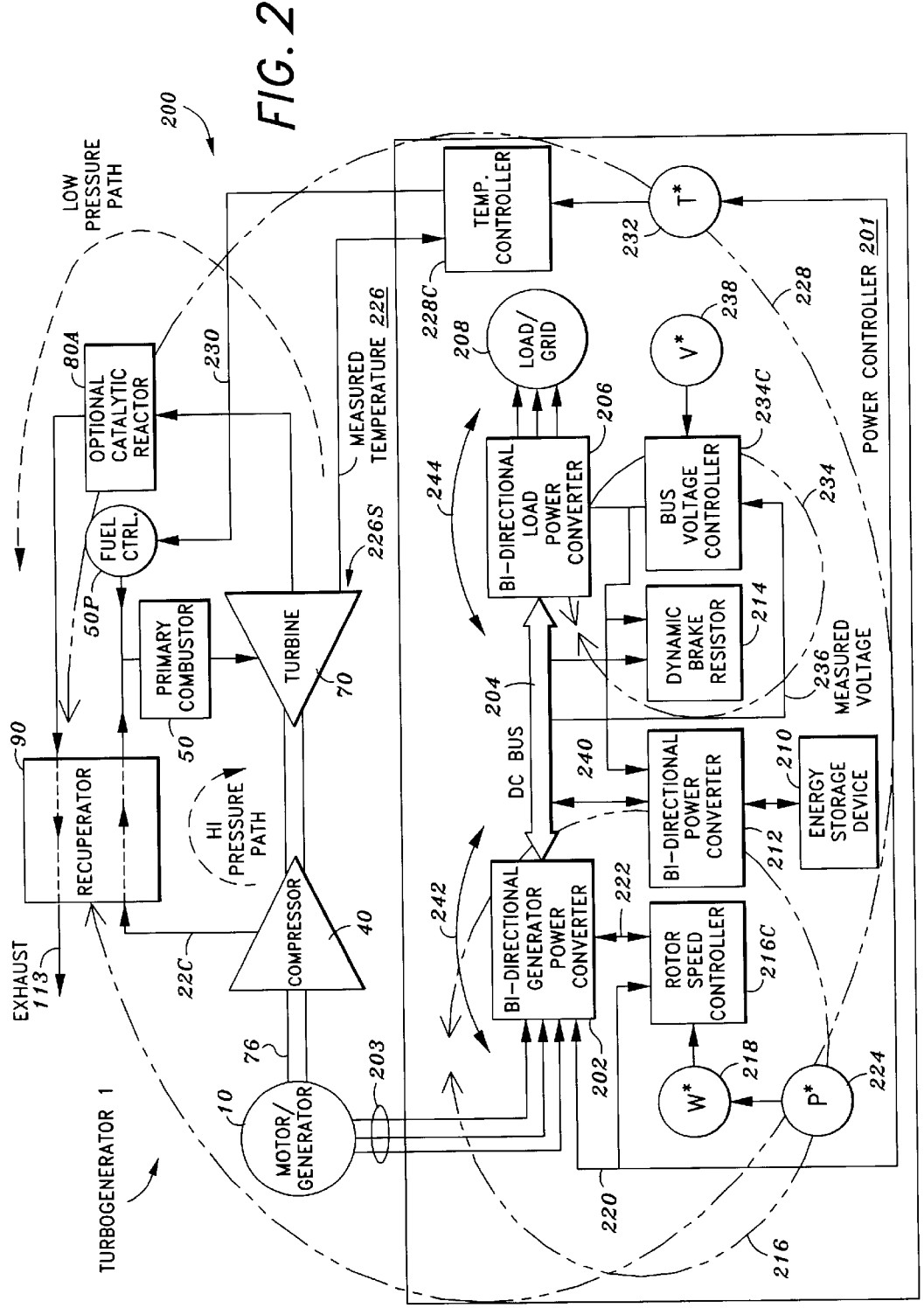
FIG. 2 is a block diagram schematic of a turbogenerator system including a power controller having decoupled rotor speed, operating temperature, and DC bus voltage control loops.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 50A. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 74 is rotatably supported preferably by a bilateral thrust bearing 78A and 78B. Journal or radial bearing 75 and thrust bearings 78A and 78B may be fluid film or foil bearings.

Turbine wheel 72, bearing rotor 74 and compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 97 of recuperator 90, as indicated by gas flow arrows 108 and 109 respectively.

In an alternate embodiment of the present disclosure, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator

The integrated turbogenerator disclosed above is exemplary. Several alternative structural embodiments are disclosed herein.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In still another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

An integrated turbogenerator is a turbogenerator in which the turbine, compressor, and generator are all constrained to rotate based upon rotation of the shaft to which the turbine is connected. The methods and apparatus disclosed herein are may be used in connection with a turbogenerator, and may be used in connection with an integrated turbogenerator.

Control System

Referring now to FIG. 2, one embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bidirectional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) load/grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bidirectional load power converter 206 and bidirectional power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bidirectional arrow 242, and controls bus voltage to a set point by (1) applying or removing power from DC bus 204 under the control of load power converter 206 as indicated by bidirectional arrow 244, (2) applying or removing power from energy storage device 210 under the control of power converter 212, and (3) by removing power from DC bus 204 by modulating the connection of dynamic brake resistor 214 to DC bus 204.

Figure 3:
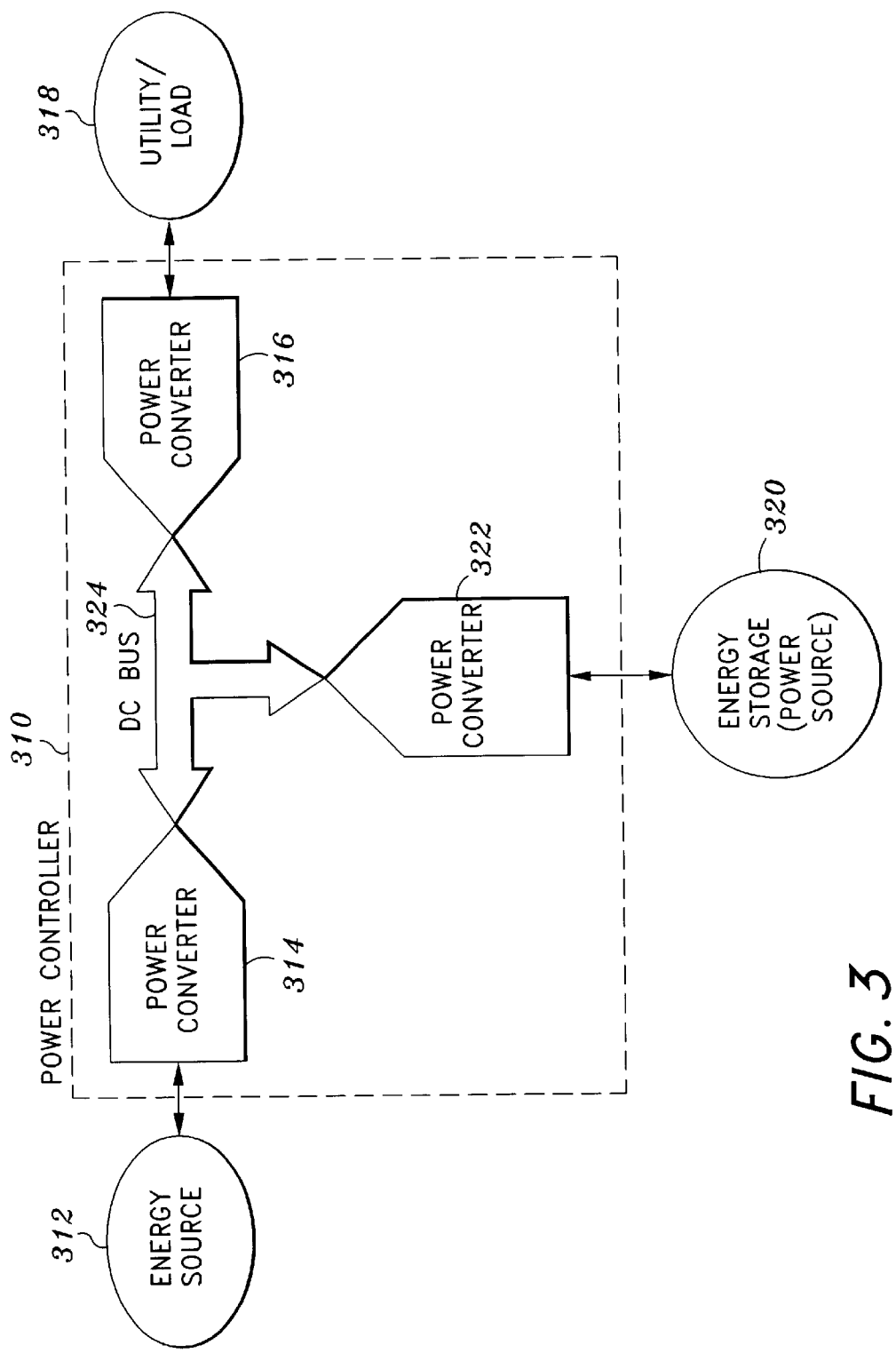
FIG. 3 is a block diagram of power controller 310 used in a power generation and distribution system according to one embodiment.

Referring to FIG. 3, power controller 310, which is an embodiment of power controller 201, includes bidirectional, reconfigurable, power converters 314, 316 and 322 used with common DC bus 324 for permitting compatibility between one or more energy components 312, 318 and/or 322. Each power converter 314, 316 and 322 operates essentially as a customized, bi-directional switching converter configured, under the control of power controller 310, to provide an interface for a specific energy component 312, 318 or 320 to DC bus 324. Power controller 310 controls the way in which each energy component 312, 318 or 320, at any moment, will sink or source power, and the manner in which DC bus 324 is regulated. In this way, various energy components can be used to supply, store and/or use power in an efficient manner.

Energy source 312 may be a turbogenerator system, photovoltaics, wind turbine or any other conventional or newly developed source. In one embodiment, energy storage/power source 320 comprises one or more capacitors such as one or more electrochemical capacitors, one or more hybrid capacitors, etc., and combinations thereof. Also coupled to the DC bus 324 may be a flywheel, battery, or any other conventional or newly developed energy storage device. Utility/load 318 may be a utility grid, DC load, drive motor or any other conventional or newly developed utility/load 318.

Figure 4:
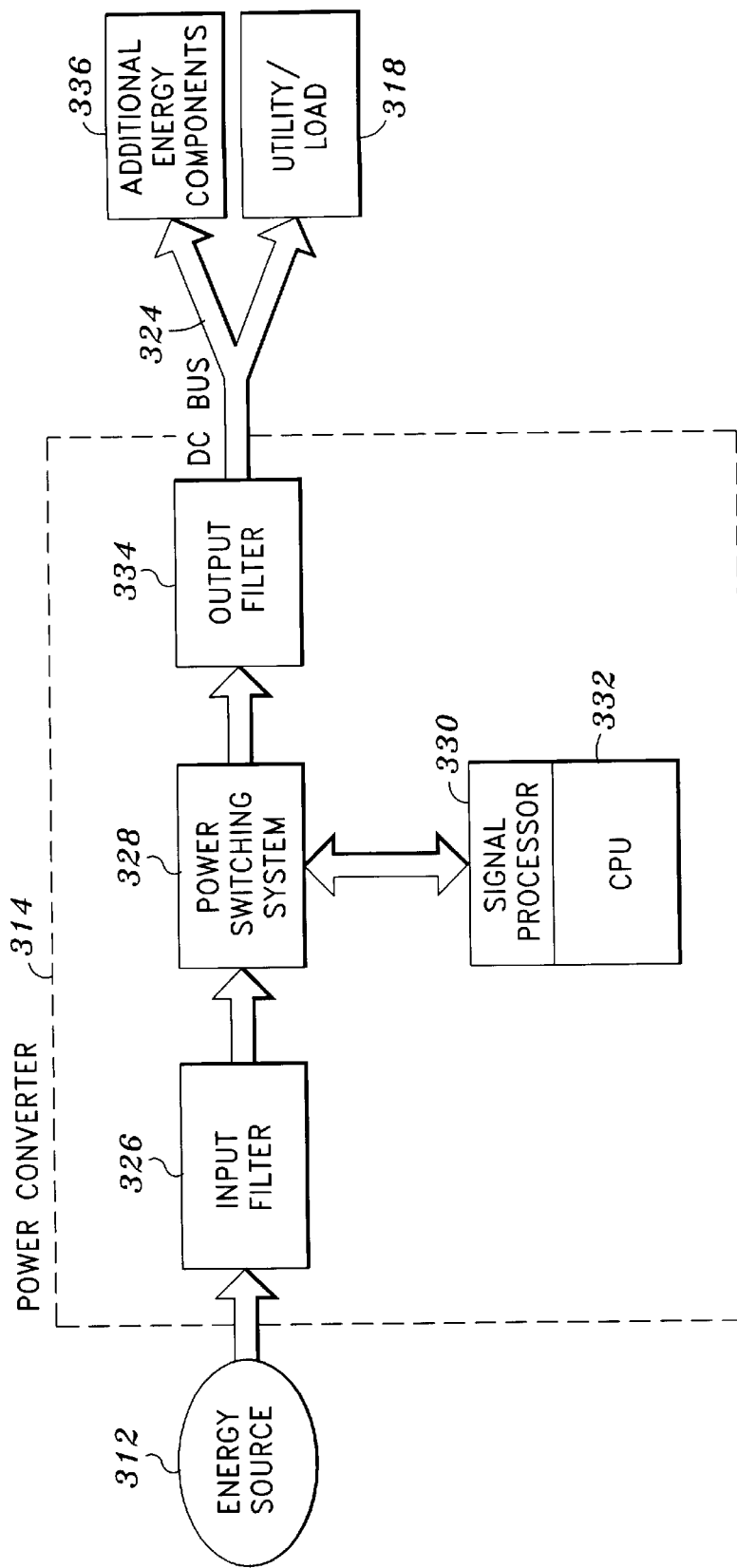
FIG. 4 is a detailed block diagram of bidirectional power converter 314 in the power controller 310 illustrated in FIG. 3.

Referring now also to FIG. 4, a detailed block diagram of bidirectional power converter 314 shown in FIG. 3, is illustrated. Energy source 312 is connected to DC bus 324 via power converter 314. Energy source 312 may be, for example, a turbogenerator including a turbine engine driving a motor/generator to produce AC which is applied to power converter 314. DC bus 324 connects power converter 314 to utility/load 318 and additional energy component(s) 336. Power converter 314 includes input filter 326, power switching system 328, output filter 334, signal processor (SP) 330 and main CPU 332. In operation, energy source 312 applies AC to input filter 326 in power converter 314. The filtered AC is then applied to power switching system 328 which may conventionally include a series of insulated gate bipolar transistor (IGBT) switches operating under the control of SP 330 which is controlled by main CPU 332. Other conventional or newly developed switches may be utilized as well. The output of the power switching system 328 is applied to output filter 334 which then applies the filtered DC to DC bus 324.

Each power converter 314, 316 and 322 operates essentially as a customized, bi-directional switching converter under the control of main CPU 332, which uses SP 330 to perform its operations. Main CPU 332 provides both local control and sufficient intelligence to form a distributed processing system. Each power converter 314, 316 and 322 is tailored to provide an interface for a specific energy component to DC bus 324.

Main CPU 332 controls the way in which each energy component 312, 318 and 320 sinks or sources power, and the way in which DC bus 324 is regulated at any time. In particular, main CPU 332 reconfigures the power converters 314, 316 and 322 into different configurations for different modes of operation. In this way, various energy components 312, 318 and 320 can be used to supply, store and/or use power in an efficient manner.

In the case of a turbogenerator, for example, power controller 310 may regulate bus voltage on the DC bus 324 independently of turbogenerator speed.

FIG. 3 shows a system topography in which DC bus 324, which may be regulated at 800 V DC, for example, is at the center of a star pattern network. In general, energy source 312 provides power to DC bus 324 via bidirectional power converter 314 during normal power generation mode. Similarly, during normal power generation mode, power converter 316 converts the power on DC bus 324 to the form required by utility/load 318, which may be any type of load (e.g., stand-alone) including a utility web or grid. During other modes of operation, such as utility start up, power converters 314 and 316 may be controlled by the main processor to operate in different manners.

For example, energy may be needed during start up to start a prime mover, such as a turbine engine in a turbogenerator included in energy source 312. This energy may come from load/utility grid 318 (during utility start up) or from energy storage/power source 320 (e.g., during energy storage start up), which may be one or more capacitors, battery, and/or flywheel.

During utility start up, power converter 316 applies power from utility/load 318 to DC bus 324. Power converter 314 applies power required from DC bus 324 to energy source 312 for startup. During utility start up, a turbine engine of a turbogenerator in energy source 312 may be controlled in a local feedback loop to maintain the turbine engine speed, typically in revolutions per minute (RPM). During utility start up, energy storage/power source 320, such as a capacitor, may be disconnected from DC bus 324 while load/utility grid 318 regulates VDC on DC bus 324.

Similarly, in energy storage start up mode, the power applied to DC bus 324 from which energy source 312 is started may be provided by energy storage/power source 320 which may be one or more capacitors (e.g., electrolytic, electrochemical, hybrid, etc.), battery, flywheel, or similar device. Energy storage/power source 320 has its own power conversion circuit in power converter 322, which limits the surge current into DC bus 324 capacitors, and allows enough power to flow to DC bus 324 to start energy source 312. In particular, power converter 316 isolates DC bus 324 so that power converter 314 can provide the required starting power from DC bus 324 to energy source 312.

Figure 5:
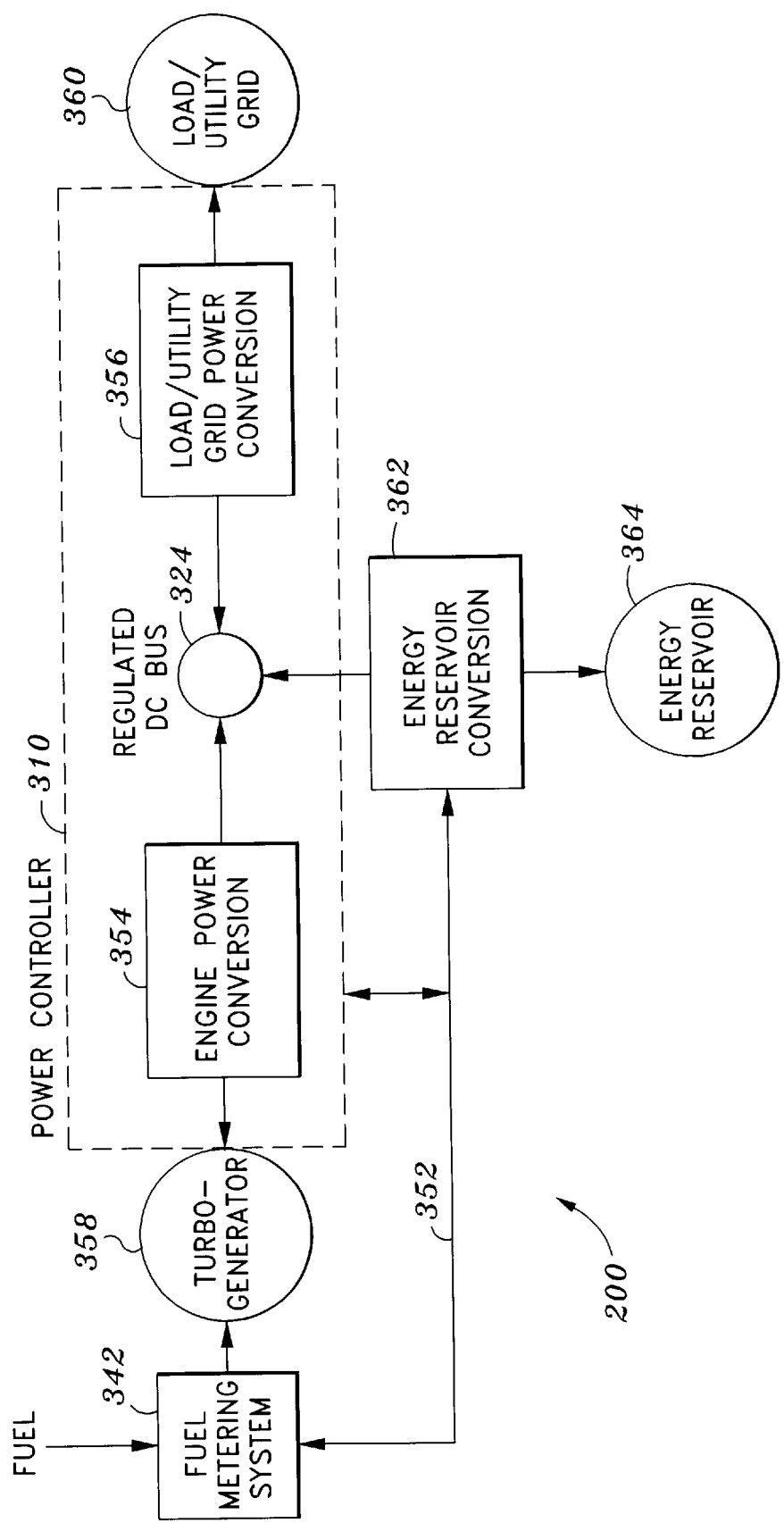
FIG. 5 is a simplified block diagram of turbogenerator system 200 including the power architecture of the power controller illustrated in FIG. 3.

Referring to FIG. 5, a simplified block diagram of turbogenerator system 200 is illustrated. Turbogenerator system 200 includes a fuel metering system 342, turbogenerator 358, power controller 310, energy reservoir conversion process 362, energy reservoir 364 and load/utility grid 360. The fuel metering system 342 is matched to the available fuel and pressure. The power controller 310 converts the electricity from turbogenerator 358 into regulated DC applied to DC bus 324 and then converts the DC power on DC bus 324 to DC or AC (e.g., utility grade AC electricity) power.

By separating the engine control from the power conversion processes, greater control of both processes is realized. All of the interconnections are provided by communications bus and power connection 352.

The power controller 310 includes bi-directional engine power conversion process 354 and bidirectional utility/load or output power conversion process 356 between turbogenerator 358 and the load/utility grid 360. The bidirectional (i.e. reconfigurable) power conversion processes 354 and 356 are used with common regulated DC bus 324 for connection with turbogenerator 358 and load/utility grid 360. Each power conversion process 354 and 356 operates essentially as a customized bidirectional switching conversion process configured, under the control of the power controller 310, to provide an interface for a specific energy component such as turbogenerator 358 or load/utility grid 360 to DC bus 324. The power controller 310 controls the way in which each energy component, at any moment, will sink or source power, and the manner in which DC bus 324 is regulated. Both of these power conversions processes 354 and 356 are capable of operating in a forward or reverse direction. This allows starting turbogenerator 358 from either the energy reservoir 364 or the load/utility grid 360. The regulated DC bus 324 allows a standardized interface to energy reservoirs such as capacitors. The embodiments disclosed herein permit the use of virtually any technology that can convert its energy to/from electricity.

Since the energy may flow in either direction to or from the energy reservoir 364, transients may be handled by supplying energy or absorbing energy therefrom. The energy reservoir 364 and its bidirectional energy reservoir conversion process 362 may be contained inside the power controller 310.

Figure 6:
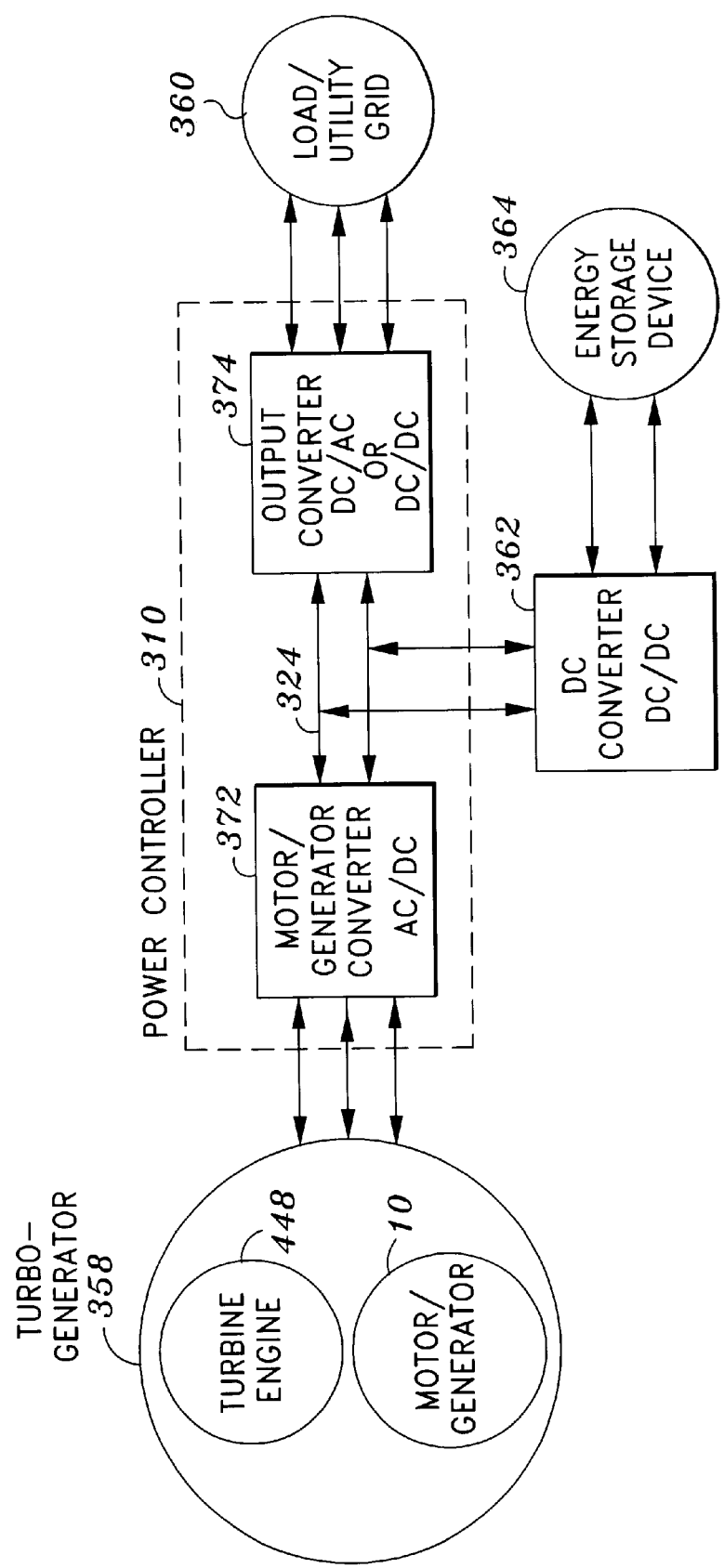
FIG. 6 is a block diagram a typical implementation of the power generation and distribution system, including power controller illustrated in FIGS. 3–6.

Referring to FIG. 6, a typical implementation of power controller 310 with a turbogenerator 358, including turbine engine 448 and motor/generator 10, is shown. The power controller 310 includes motor/generator converter 372 and output converter 374 between turbogenerator 358 and the load/utility grid 360.

In particular, in the normal power generation mode, the motor/generator converter 372 provides for AC to DC power conversion between motor/generator 10 and DC bus 324 and the output converter 374 provides for DC to AC or DC to DC power conversion between DC bus 324 and load/utility grid 360. Both of these power converters 372 and 374 are capable of operating in a forward or reverse direction. This allows starting turbogenerator 358 by supplying power to motor/generator 10 from either the energy storage device 364 or the load/utility grid 360.

Since the energy may flow in either direction to or from the energy storage device 364, transients may be handled by supplying or absorbing energy therefrom. The DC converter 362 provides for DC to DC power conversion.

Figure 7:
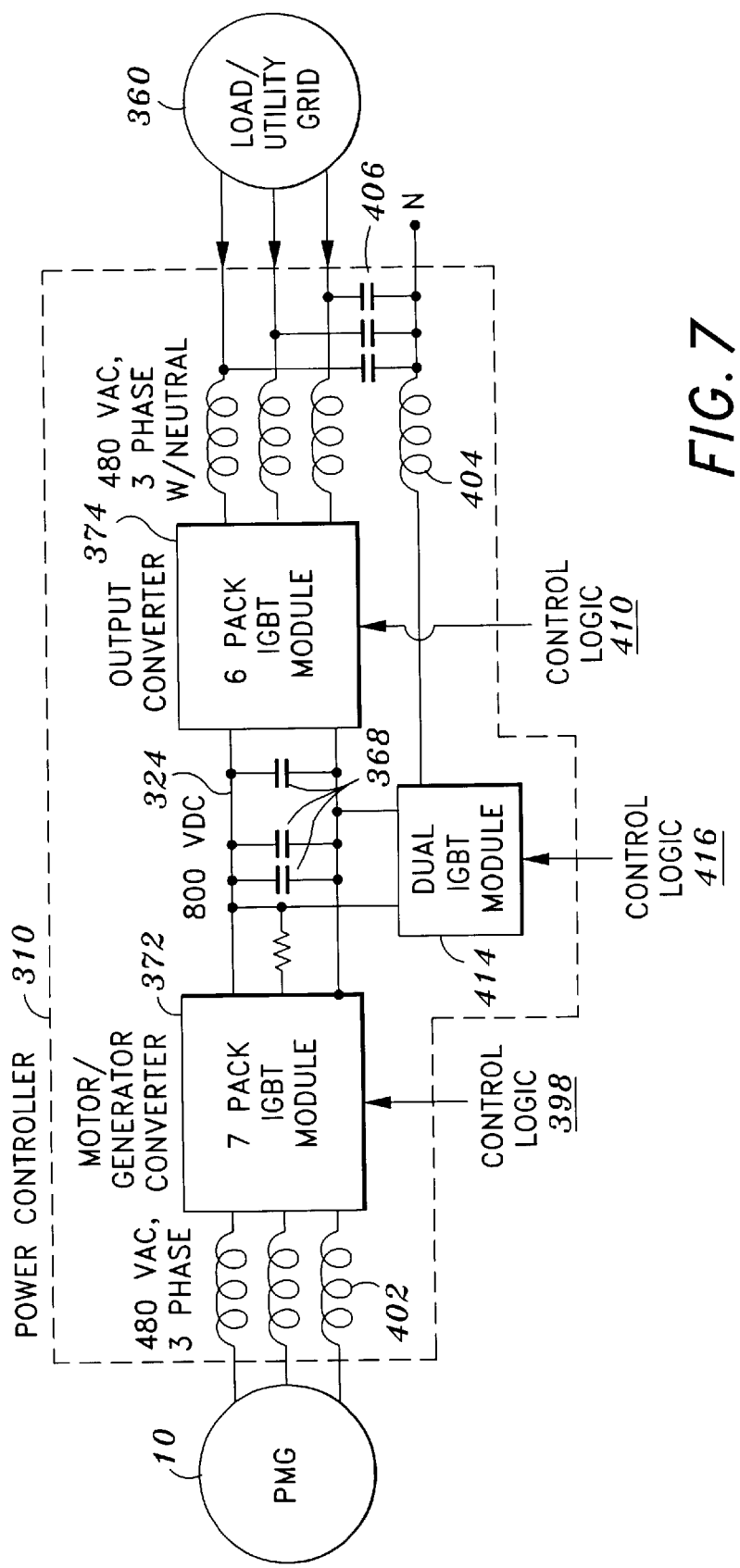
FIG. 7 is a schematic diagram of the internal power architecture of the power controller illustrated in FIGS. 3–7.

Referring now also to FIG. 7, a partial schematic of an internal power architecture of an exemplary system, as shown in FIG. 6, where the output converter 374 is a DC to AC converter, is shown in greater detail. Turbogenerator 358 includes an integral motor/generator 10, such as a permanent magnet motor/generator, rotationally coupled to the turbine engine 448 therein that can be used as either a motor (for starting) or a generator (for normal mode of operation). Because all of the controls can be performed in the digital domain and all switching (except for one output contactor such as output contactor 510 shown below in FIG. 10) is done with solid state switches, it is easy to shift the direction of the power flow as needed. This permits very tight control of the speed of turbine engine 448 during starting and stopping.

In one configuration, the power output may be a 480 VAC, 3-phase output. The system may be adapted to provide for other power output requirements such as a 3-phase, 400 VAC, single-phase, 480 VAC, DC output, etc.

Power controller 310 includes motor/generator converter 372 and output converter 374. Motor/generator converter 372 includes IGBT switches, such as a seven-pack IGBT module driven by control logic 398, providing a variable voltage, variable frequency 3-phase drive to the motor/generator 10 from DC bus 324 during startup. Inductors 402 are utilized to minimize any current surges associated with the high frequency switching components which may affect the motor/generator 10 to increase operating efficiency.

Figure 20:
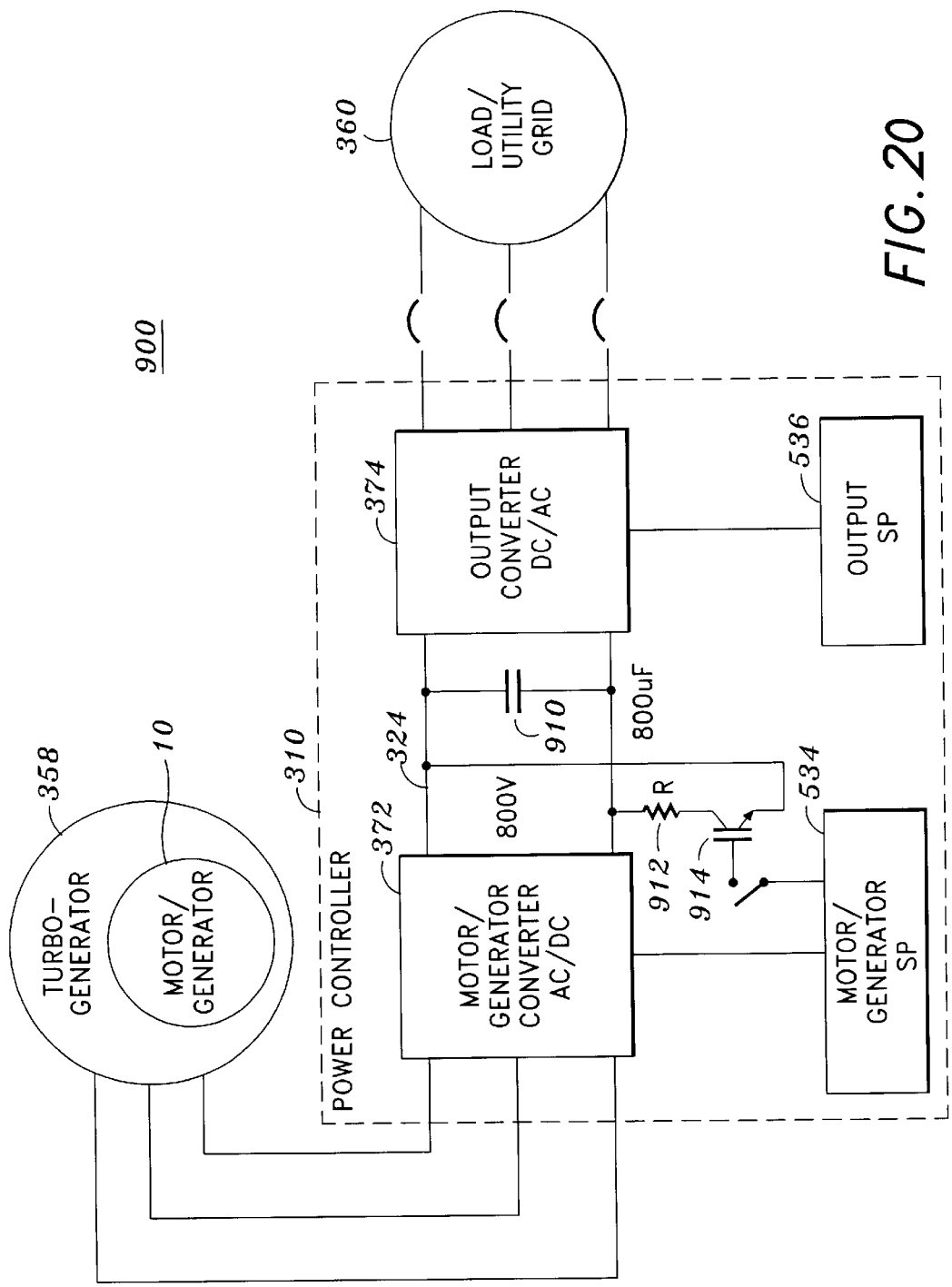
FIG. 20 is a diagram of power controller 310 previous figures, including brake resistor 912 and brake resistor modulation switch 914.

Motor/Generator converter 372 controls motor/generator 10 and the turbine engine 448 of turbogenerator 358. Motor/generator converter 372 incorporates gate driver and fault sensing circuitry as well as a seventh IGBT used as a switch such as switch 914 to dump power into a resistor, such as brake resistor 912, as shown in FIG. 20 below. The gate drive inputs and fault outputs require external isolation. Four external, isolated power supplies are required to power the internal gate drivers. Motor/generator converter 372 is typically used in a turbogenerator system that generates 480 VAC at its output terminals delivering power to a stand-alone or utility-connected load. During startup and cool down (and occasionally during normal operation), the direction of power flow through motor/generator converter 372 reverses. When the turbine engine of turbogenerator 358 is being started, power is supplied to the DC bus 324 from either an energy reservoir such as a one or more electrochemical (e.g., super-capacitor, ultra-capacitor, etc.) or hybrid capacitors (not shown in this figure) or from load/utility grid 360. The DC on DC bus 324 is then converted to variable voltage, variable frequency AC voltage to operate motor/generator 10 as a motor to start the turbine engine 448 in turbogenerator 358.

For utility grid connect operation, control logic 410 may sequentially drive solid state IGBT switches, typically configured in a six-pack IGBT module, associated with load or output converter 374 to boost the utility voltage to provide start power to the motor/generator converter 372. In one embodiment, the IGBT switches in load or output converter 374 are operated at a high (15 kHz) frequency, and modulated in a pulse width modulation manner to provide four quadrant power converter operation. Inductors 404 and AC filter capacitors 406 are utilized to minimize any current surges associated with the high frequency switching components which may affect load/utility grid 360.

Output converter 374 is part of the electronics that controls the converter of the turbine. Output converter 374 incorporates gate driver and fault sensing circuitry. The gate drive inputs and fault outputs require external isolation. Four external, isolated power supplies are required to power the internal gate drivers.

After turbogenerator 358 is running, output converter 374 is used to convert the regulated DC bus voltage to the approximately 50 or 60 hertz frequency typically required for utility grade power to supply utility grid/load 360.

When there is no capacitor (or other energy reservoir), the energy to run turbogenerator 358 during startup and cool down comes from load/utility grid 360. Under this condition, the direction of power flow through the six-pack IGBT module in output converter 374 reverses. DC bus 324 receives its energy from load/utility grid 360, via the six-pack IGBT module in output converter 374 acting as a rectifier. The DC on bus 324 is then converted to a variable frequency AC voltage by motor/generator converter 372 to operate motor/generator 10 as a motor to start turbogenerator 358. To accelerate the turbine engine 448 of turbogenerator 358 as rapidly as possible, current initially flows at the maximum rate through the seven-pack IGBT module in motor/generator converter 372 and also through the six-pack IGBT module in output converter 374.

Dual IGBT module 414, driven by control logic 416, may also be used to provide an optional neutral to supply 3 phase, 4 wire loads.

Figure 10:
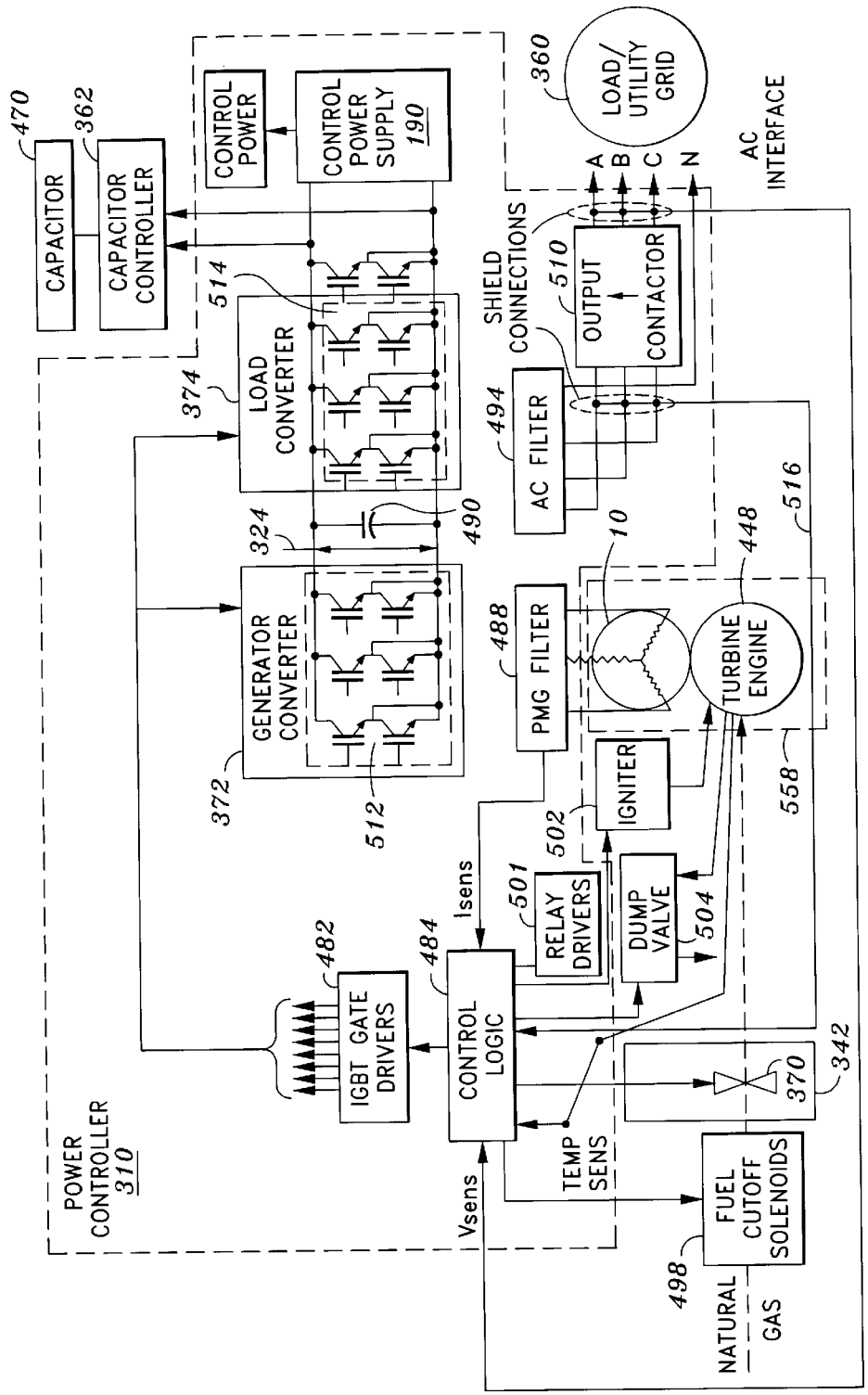
FIG. 10 is a schematic diagram of a power controller interface between a load/utility grid and a turbogenerator as shown in FIGS. 3–10.

The energy needed to start turbogenerator 358 may come from load/utility grid 360 or from energy reservoir 364, such as an electrochemical capacitor, battery, or flywheel. When utility grid 360 supplies the energy, utility grid 360 is connected to power controller 310 through two circuits. First is an output contactor, such as output contactor 510 as shown in FIG. 10, that handles the full power. Second is a "soft-start" or "pre-charge" circuit that supplies limited power (it is current limited to prevent very large surge currents) from utility grid 360 to DC bus 324 through a simple rectifier. The amount of power supplied through the soft-start circuit is enough to start the housekeeping power supply, power the control board, and run the power supplies for the IGBTs, and close the output contactor. When the output contactor closes, the IGBTs are configured to create DC from the AC waveform. Enough power is created to run the fuel metering circuit 342, start the engine, and close the various solenoids (including the dump valve on the engine).

When energy reservoir 364 supplies the energy, energy reservoir 364 has its own power conversion circuit, energy reservoir conversion process 362, that limits the surge circuit into DC bus capacitors 368. Energy reservoir 364 allows enough power to flow to DC bus 324 to run fuel-metering circuit 342, start turbine engine 448, and close the various solenoids (including the dump valve on turbine engine 448). After turbine engine 448 becomes self-sustaining, the energy reservoir 364 starts to replace the energy used to start turbine engine 448, by drawing power from DC bus 324.

In addition to the sequences described above, power controller 310 senses the presence of other controllers during the initial power up phase. If another controller is detected, the controller must be part of a multi-pack, and proceeds to automatically configure itself for operation as part of a multi-pack.

Figure 8:
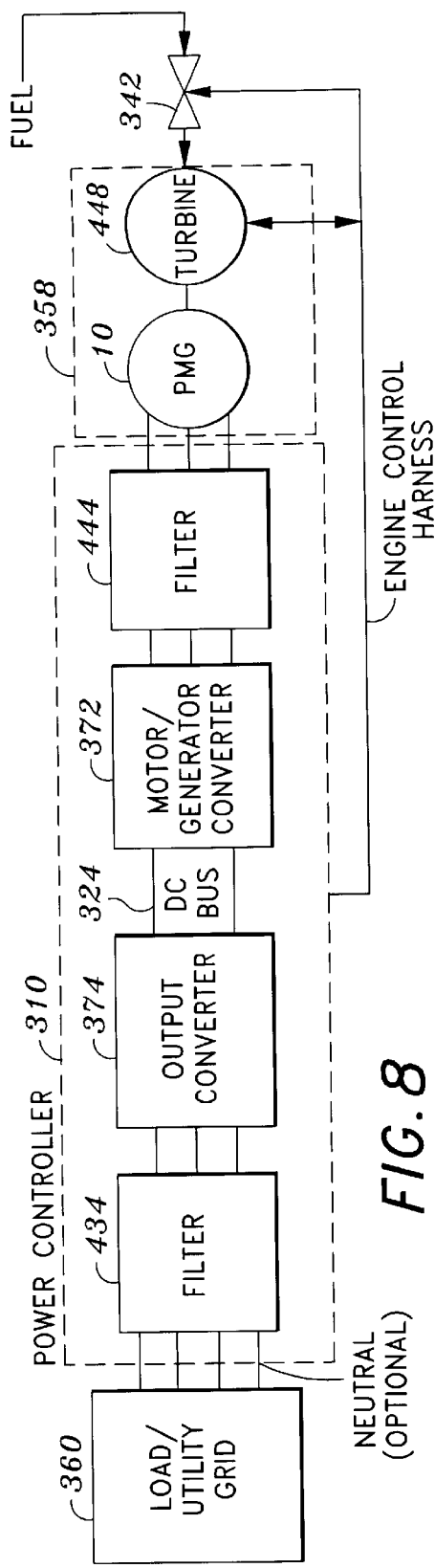
FIG. 8 is a functional block diagram of a power controller interface between a load/utility grid and a turbogenerator illustrated in FIGS. 3–8.

Referring now to FIG. 8, a functional block diagram of an interface between load/utility grid 360 and turbogenerator 358, using power controller 310, is shown. In this example, power controller 310 includes filter 434, two bidirectional converters 372 and 374, connected by DC bus 324 and filter 444. Motor/generator converter 372 starts turbine engine 448, using motor/generator 10 as a motor, from the load or energy reservoir. Load or output converter 374 produces AC or DC power using an output from motor/generator converter 372 to draw power from high-speed motor/generator 10. Power controller 310 also regulates fuel to turbine engine 448 via fuel control 342 and provides communications between units (in paralleled systems) and to external entities.

During a utility startup sequence, load/utility grid 360 supplies starting power to turbine 448 by "actively" rectifying the utility grid power via load or output converter 374 to apply DC to DC bus 324, and then converting the DC to variable voltage, variable frequency 3-phase power in motor/generator converter 372.

Figure 9:
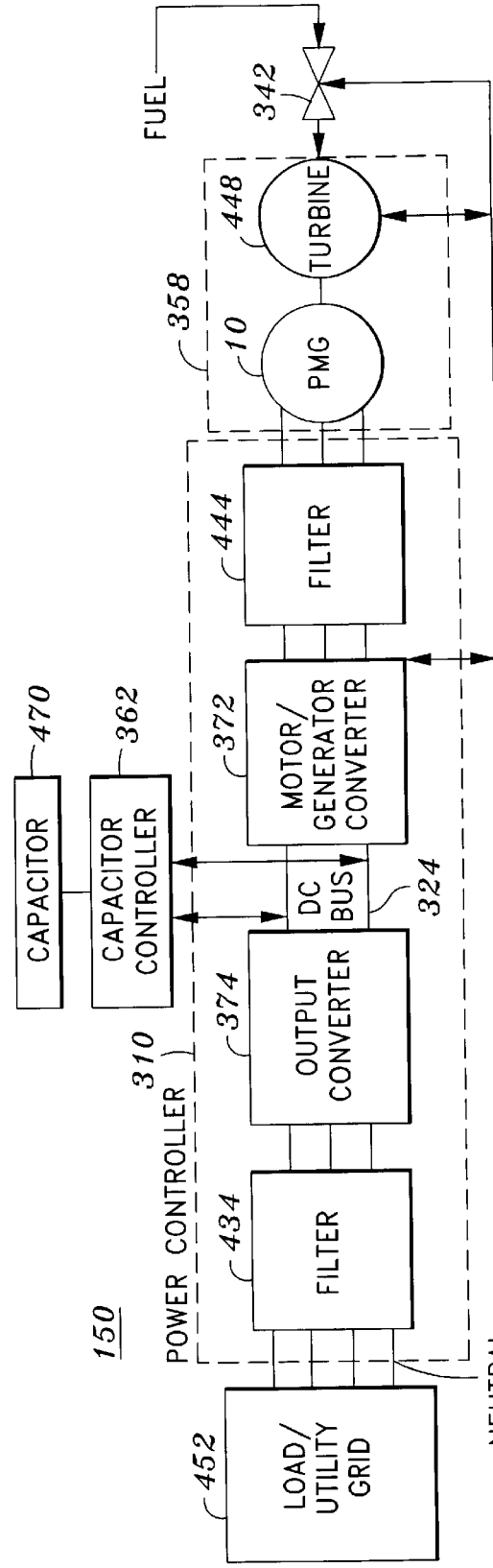
FIG. 9 is a functional block diagram of a power controller interface between a load/utility grid and a turbogenerator as shown in FIG. 8 including a supplemental energy source.

As is illustrated in FIG. 9, for stand-alone applications, the start sequence under the control of power controller 310 may be the same as the utility start sequence shown in FIG. 8 with the exception that the start power comes from capacitor(s) 470 under the control of capacitor controller 362. Load 452 is fed from the output terminals of output converter 374 via filter 434.

Referring to FIG. 10, a more detailed schematic illustration of an interface between load/utility grid 360 and turbogenerator 358 using power controller 310, where the load/utility grid 360 is an AC load/utility grid, is illustrated. Control logic 484 provides power to fuel cutoff solenoids 498, fuel control system 342 and igniter 502. Capacitor controller 362 and capacitor(s) 470, if used, connect directly to DC bus 324. Fuel control system 342 may include a fuel control valve or fuel compressor 370 operated from a separate variable speed drive which can also derive its power directly from DC bus 324.

In operation, control and start power comes from either capacitor 470 (for capacitor start applications) or from load/utility grid 360, which is connected via a rectifier with inrush limiting to slowly charge internal bus capacitor 490.

For utility grid connect start up operations, control logic 484 sequentially drives solid state IGBT switches 514 associated with output converter 374 to boost the utility voltage to provide start power to motor/generator converter 372. Switches 514 are preferably operated at a high (15 kHz) frequency, and modulated in a pulse width modulation (PWM) manner to provide four quadrant power converter operation. PWM output converter 374 either sources power from DC bus 324 to utility grid 360 or from utility grid 360 to DC bus 324. A current regulator (not shown) may achieve this control. Optionally, two of the switches 514 may serve to create an artificial neutral for stand-alone applications. For stand-alone applications, start power from capacitor(s) 470 via converter 362 is applied directly to DC bus 324.

Solid state (IGBT) switches 512 associated with motor/generator converter 372 are also driven from control logic 484, providing a variable voltage, variable frequency 3-phase drive to motor/generator 10 to start turbine engine 448. Control logic 484 receives feedback via current sensors Isens from motor/generator filter 488 as turbine engine 448 is ramped up in speed to complete the start sequence. When turbine engine achieves a self sustaining speed of, for example, approx. 40,000 RPM, motor/generator converter 372 changes its mode of operation to boost the motor/generator output voltage and provide a regulated DC bus voltage.

The voltage, Vsens, at the AC Interface between output contactor 510 and load/utility grid 360 is applied as an input to control logic 484. The temperature of turbine engine 448, Temp Sens, is also applied as an input to control logic 484. Control logic 484 drives IGBT gate drivers 482, relay or contactor drivers 501, dump valve 504, fuel cutoff solenoid 498, and fuel supply system 342.

Motor/generator filter 488 associated with motor/generator converter 372 includes three inductors to remove the high frequency switching component from motor/generator 10 to increase operating efficiency. Output AC filter 494 associated with output converter 374 includes three or optionally four inductors (not shown) and AC filter capacitors (not shown) to remove the high frequency switching component. Output contactor 510 disengages output converter 374 in the event of a unit fault.

During a start sequence, control logic 484 opens fuel cutoff solenoid 498 and maintains it open until the system is commanded off. Fuel control system 342 may be a variable flow valve providing a dynamic regulating range, allowing minimum fuel during start and maximum fuel at full load. A variety of fuel controllers, including but not limited to, liquid and gas fuel controllers, may be utilized. Fuel control can be implemented by various configurations, including but not limited to modulating pump and/or compressor speed and/or control valve position such as fuel control valve 370 accepting fuel pressures as low as approximately ¼ psig. Igniter 502, a spark type device similar to a spark plug for an internal combustion engine, is operated during the start sequence and may be operated to maintain combustion stability especially when operating at low power output levels or at idle.

For stand-alone operation, turbine engine 448 is started using external capacitor(s) 470 (via converter 362) which boosts voltage from capacitor(s) 470, and connects directly to the DC bus 324. Output converter 374 is then configured as a constant voltage, constant frequency (for example, approximately 50 or 60 Hz) source. One skilled in the art will recognize that the output is not limited to a constant voltage, constant frequency source, but rather may be a variable voltage, variable frequency source. For rapid increases in output demand, capacitor(s) 470 supplies energy temporarily to DC bus 324 and to the output. The energy is restored after a new operating point is achieved.

For utility grid connect operation, the utility grid power is used for starting as described above. When turbine 448 has reached a desired operating speed, output converter 374 is operated at utility grid frequency, synchronized with utility grid 360, and essentially operates as a current source power converter, requiring utility grid voltage for excitation. If utility grid 360 collapses, the loss of utility grid 360 is sensed, the unit output goes to zero (0) and disconnects. The unit can receive external control signals to control the desired output power, such as to offset the power drawn by a facility, but ensure that the load is not backfed from the system.

Figure 11:
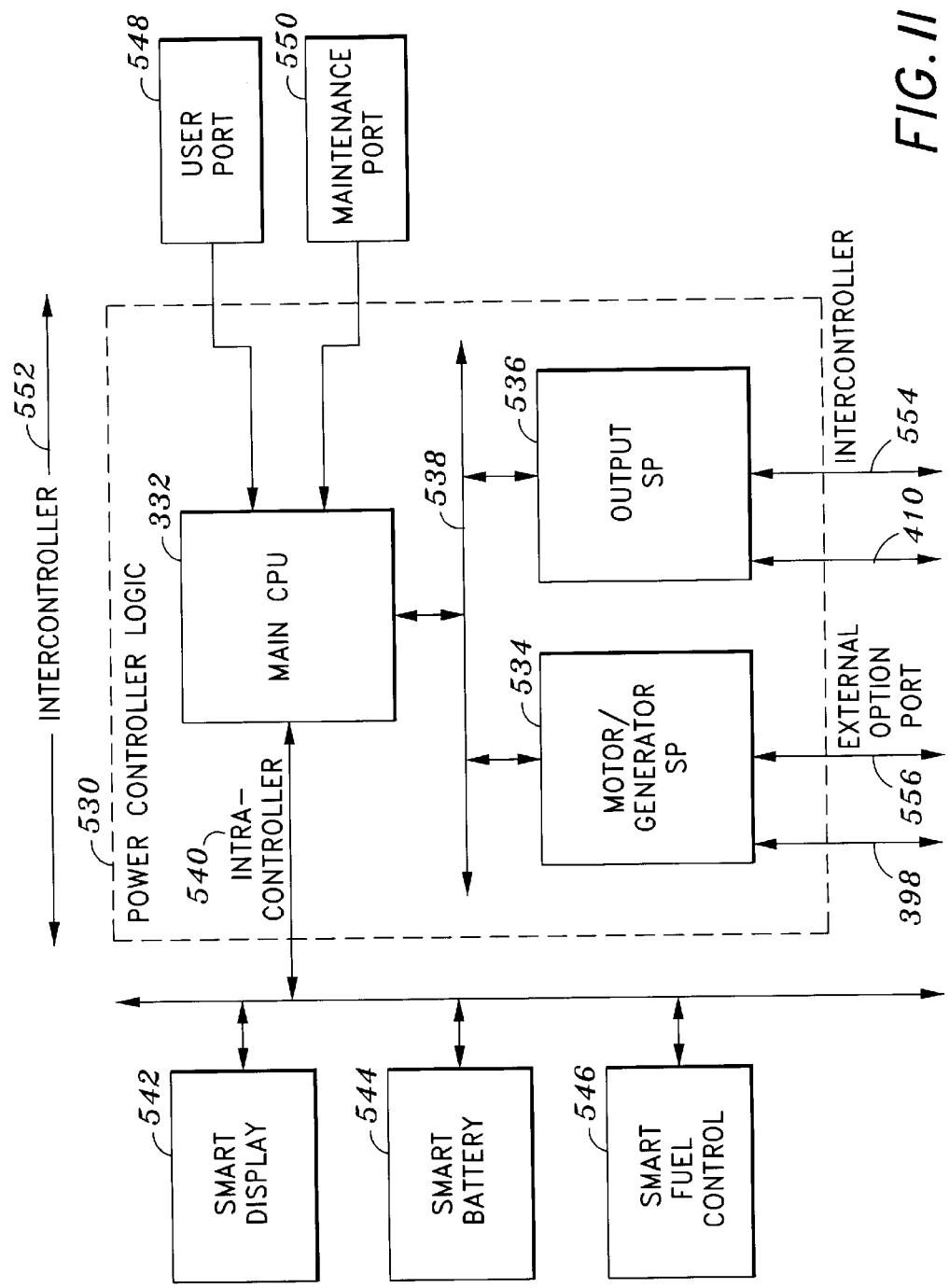
FIG. 11 is a block diagram of the logic architecture for the power controller including external interfaces, as shown in FIGS. 3–11.

Referring to FIG. 11, power controller logic 530 includes main CPU 332, motor/generator SP 534 and output SP 536. Main CPU software program sequences events which occur inside power controller logic 530 and arbitrates communications to externally connected devices. Main CPU 332 is preferably a MC68332 microprocessor, available from Motorola Semiconductor, Inc. of Phoenix, Ariz. Other suitable commercially available microprocessors may be used as well. The software performs the algorithms that control engine operation, determine power output and detect system faults.

Commanded operating modes are used to determine how power is switched through the major power converters in power controller 310. The software is responsible for turbine engine control and issuing commands to other SP processors enabling them to perform the motor/generator power converter and output/load power converter power switching. The controls also interface with externally connected energy storage devices (not shown) that provide black start and transient capabilities.

Motor/generator SP 534 and output SP 536 are connected to main CPU 332 via serial peripheral interface (SPI) bus 538 to perform motor/generator and output power converter control functions. Motor/generator SP 534 is responsible for any switching which occurs between DC bus 324 and motor/generator 10. Output SP 536 is responsible for any switching which occurs between DC bus 324 and load/utility grid 360.

As illustrated in FIG. 7, motor/generator SP 534 operates the IGBT module in motor/generator converter 372 via control logic 398 while output SP 536 operates the IGBT module in output converter 374 via control logic 410.

Local devices, such as a smart display 542, smart battery 544 and smart fuel control 546, are connected to main CPU 332 in via intracontroller bus 540, which may be a RS485 communications link. Smart display 542, smart battery 544 and smart fuel control 546 performs dedicated controller functions, including but not limited to display, energy storage management, and fuel control functions.

Main CPU 332 in power controller logic 530 is coupled to user port 548 for connection to a computer, workstation, modem or other data terminal equipment which allows for data acquisition and/or remote control. User port 548 may be implemented using a RS232 interface or other compatible interface.

Main CPU 332 in power controller logic 530 is also coupled to maintenance port 550 for connection to a computer, workstation, modem or other data terminal equipment which allows for remote development, troubleshooting and field upgrades. Maintenance port 550 may be implemented using a RS232 interface or other compatible interface.

Figure 17:
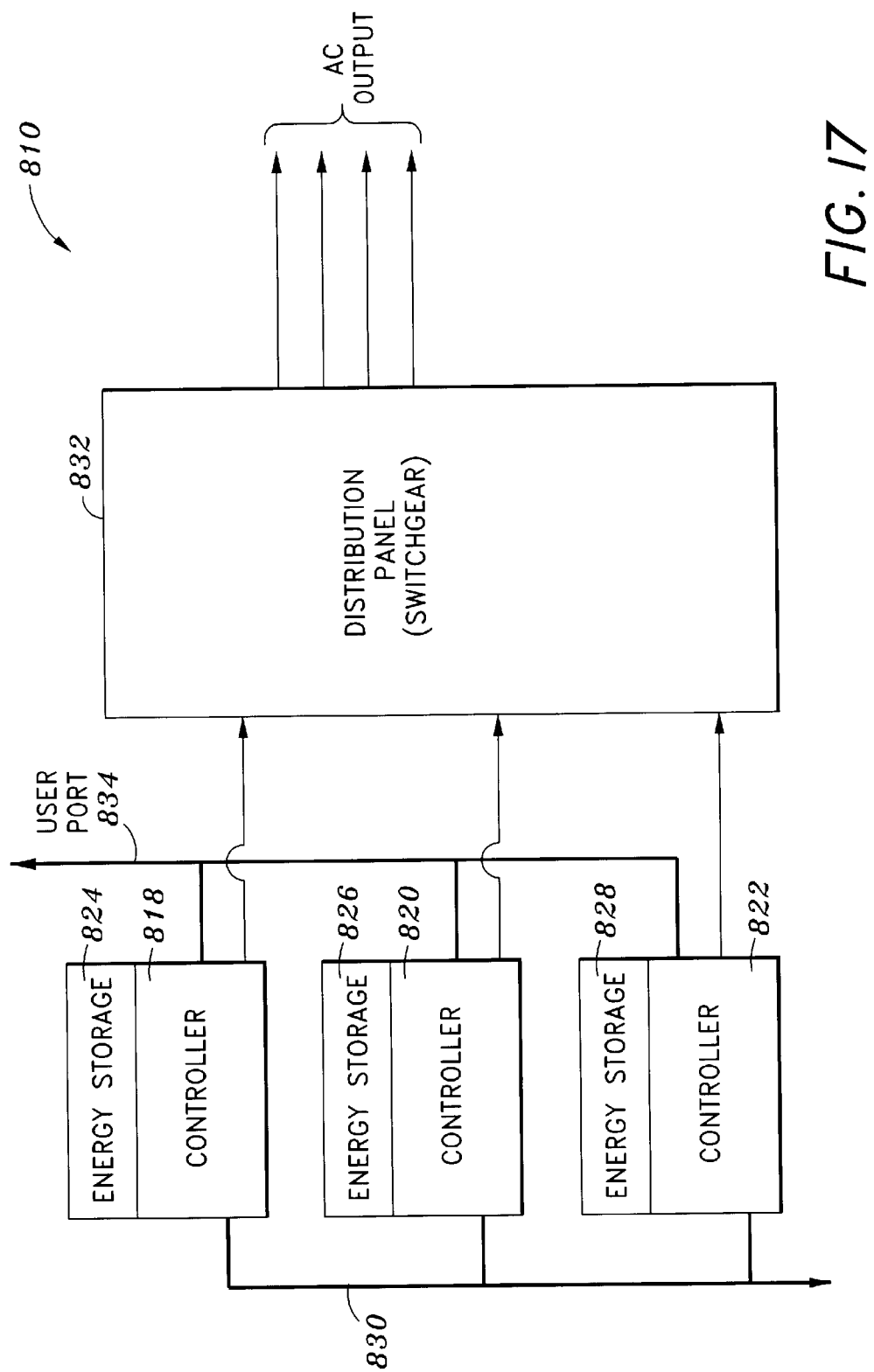
FIG. 17 is a block diagram of the power controllers in multi-pack configuration.

The main CPU processor software communicates data through a TCP/IP stack over intercontroller bus 552, typically an Ethernet 10 Base 2 interface, to gather data and send commands between power controllers (as shown and discussed in detail with respect to FIG. 17). The main CPU processor software provides seamless operation of multiple paralleled units as a single larger generator system. One unit, the master, arbitrates the bus and sends commands to all units.

Intercontroller bus 552, which may be a RS485 communications link, provides high-speed synchronization of power output signals directly between output converter SPs, such as output SP 536. Although the main CPU software is not responsible for communicating on the intercontroller bus 552, it informs output converter SPs, including output SP 536, when main CPU 332 is selected as the master. External option port bus 556, which may be a RS5485 communications link, allows external devices, including but not limited to power meter equipment and auto disconnect switches, to be connected to motor/generator SP 534.

In operation, main CPU 332 begins execution with a power on self-test when power is applied to the control board. External devices are detected providing information to determine operating modes the system is configured to handle. Power controller logic 530 waits for a start command by making queries to external devices. Once received, power controller logic 530 sequences up to begin producing power. As a minimum, main CPU 332 sends commands to external smart devices 542, 544 and 546 to assist with bringing power controller logic 530 online.

If selected as the master, the software may also send commands to initiate the sequencing of other power controllers (FIG. 17) connected in parallel. A stop command will shutdown the system bringing it offline.

The main CPU 332 software interfaces with several electronic circuits (not shown) on the control board to operate devices that are universal to all power controllers 310. Interface to system I/O begins with initialization of registers within power controller logic 530 to configure internal modes and select external pin control. Once initialized, the software has access to various circuits including discrete inputs/outputs, analog inputs/outputs, and communication ports. These external devices may also have registers within them that require initialization before the device is operational.

Each of the following sub-sections provides a brief overview that defines the peripheral device the software must interface with. The contents of these sub-sections do not define the precise hardware register initialization required.

Referring to FIG. 11, main CPU 332 is responsible for all communication systems in power controller logic 530. Data transmission between a plurality of power controllers 310 is accomplished through intercontroller bus 552. Main CPU 332 initializes the communications hardware attached to power controller logic 530 for intercontroller bus 552.

Main CPU 332 provides control for external devices, including smart devices 542, 544 and 546, which share information to operate. Data transmission to external devices, including smart display 542, smart battery 544 and smart fuel control 546 devices, is accomplished through intracontroller communications bus 540. Main CPU 332 initializes any communications hardware attached to power controller logic 530 for intracontroller communications bus 540 and implements features defined for the bus master on intracontroller communications bus 540.

Communications between devices such as switch gear and power meters used for master control functions exchange data across external equipment bus 556. Main CPU 332 initializes any communications hardware attached to power controller logic 530 for external equipment bus 556 and implements features defined for the bus master on external equipment bus 556.

Communications with a user computer is accomplished through user interface port 548. Main CPU 332 initializes any communications hardware attached to power controller logic 530 for user interface port 548. In one configuration, at power up, the initial baud rate will be selected to 19200 baud, 8 data bits, 1 stop, and no parity. The user has the ability to adjust and save the communications rate setting via user interface port 548 or optional smart external display 542. The saved communications rate is used the next time power controller logic 530 is powered on. Main CPU 332 communicates with a modem (not shown), such as a Hayes compatible modem, through user interface port 548. Once communications are established, main CPU 332 operates as if were connected to a local computer and operates as a slave on user interface port 548, responding to commands issued.

Communications to service engineers, maintenance centers, and so forth are accomplished through maintenance interface port 550. Main CPU 332 initializes the communications to any hardware attached to power controller logic 530 for maintenance interface port 550. In one implementation, at power up, the initial baud rate will be selected to 19200 baud, 8 data bits, 1 stop, and no parity. The user has the ability to adjust and save the communications rate setting via user port 548 or optional smart external display 542. The saved communications rate is used the next time power controller logic 530 is powered on. Main CPU 332 communicates with a modem, such as a Hayes compatible modem, through maintenance interface port 550. Once communications are established, main CPU 332 operates as if it were connected to a local computer and operates as a slave on maintenance interface port 550, responding to commands issued.

Still referring to FIG. 11, main CPU 332 orchestrates operation for motor/generator, output power converters, and turbine engine controls for power controller logic 530. The main CPU 332 does not directly perform motor/generator and output power converter controls. Rather, motor/generator and output SP processors 534 and 536 perform the specific control algorithms based on data communicated from main CPU 332. Engine controls are performed directly by main CPU 332 (see FIG. 16).

Main CPU 332 issues commands via SPI communications bus 538 to motor/generator SP 534 to execute the required motor/generator control functions. Motor/generator SP 534 will operate motor/generator 10, shown in FIG. 10, in either a DC bus voltage mode or a RPM mode as selected by main CPU 332. In the DC bus voltage mode, motor/generator SP 534 uses power from the motor/generator 10 to maintain the DC bus voltage at the setpoint. In the RPM mode, motor/generator SP 534 uses power from the motor/generator 10 to maintain the engine speed of turbine engine 448 at the setpoint. Main CPU 332 provides Setpoint values.

Main CPU 332 issues commands via SPI communications bus 538 to output SP 536 to execute required power converter control functions. Output SP 536 will operate the output converter 374, shown in FIG. 7, in a DC bus voltage mode, output current mode, or output voltage mode as selected by main CPU 332. In the DC bus voltage mode, output SP 536 regulates the utility power provided by output converter 374 to maintain the voltage of DC bus 324 at the setpoint.

In the output current mode, output SP 536 uses power from the DC bus 324 to provide commanded current out of the output converter 374 for load/utility grid 360. In the output voltage mode, output SP 536 uses power from the DC bus 324 to provide commanded voltage out of the output converter 374 for load/utility grid 360. Main CPU 332 provides Setpoint values.

Figure 12:
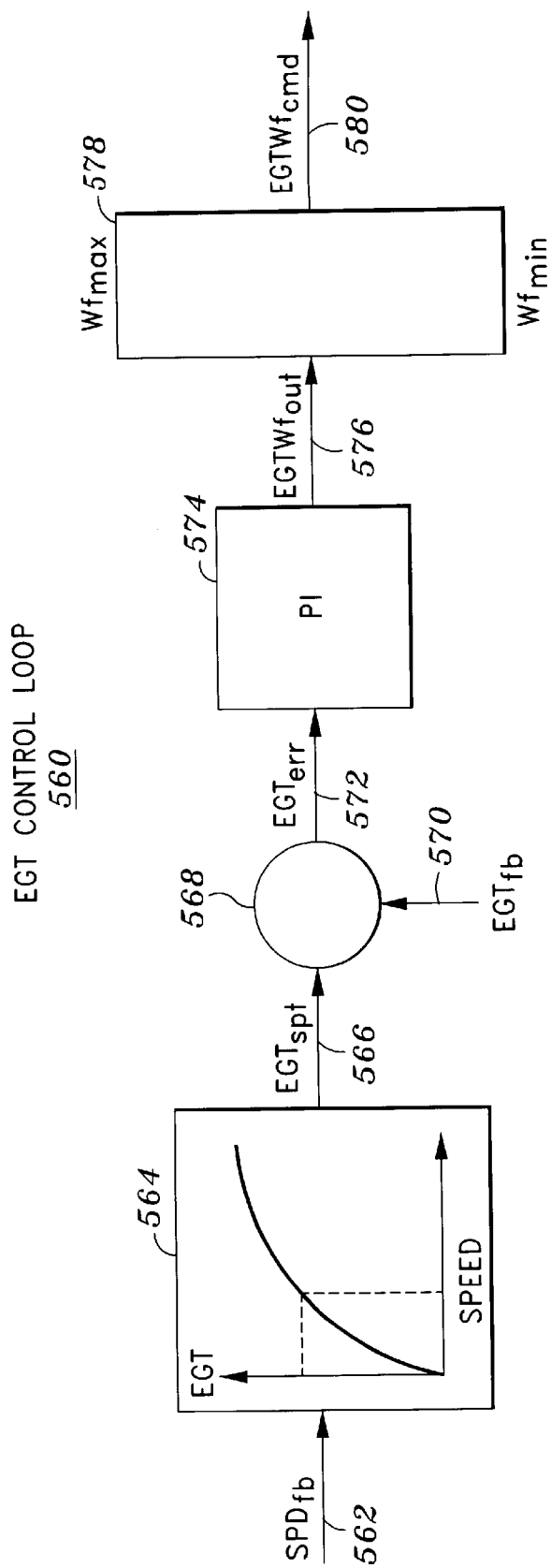
FIG. 12 is a block diagram of an EGT control mode loop for regulating the temperature of turbogenerator 358 by operation of fuel control system 342.
Figure 13:
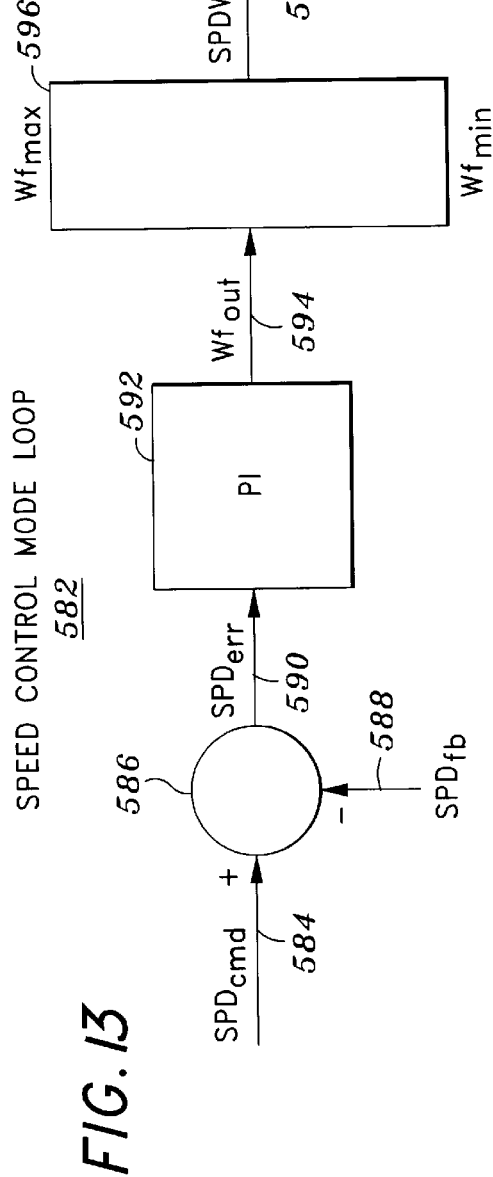
FIG. 13 is a block diagram of a speed control mode loop for regulating the rotating speed of turbogenerator 358 by operation of fuel control system 342.
Figure 14:
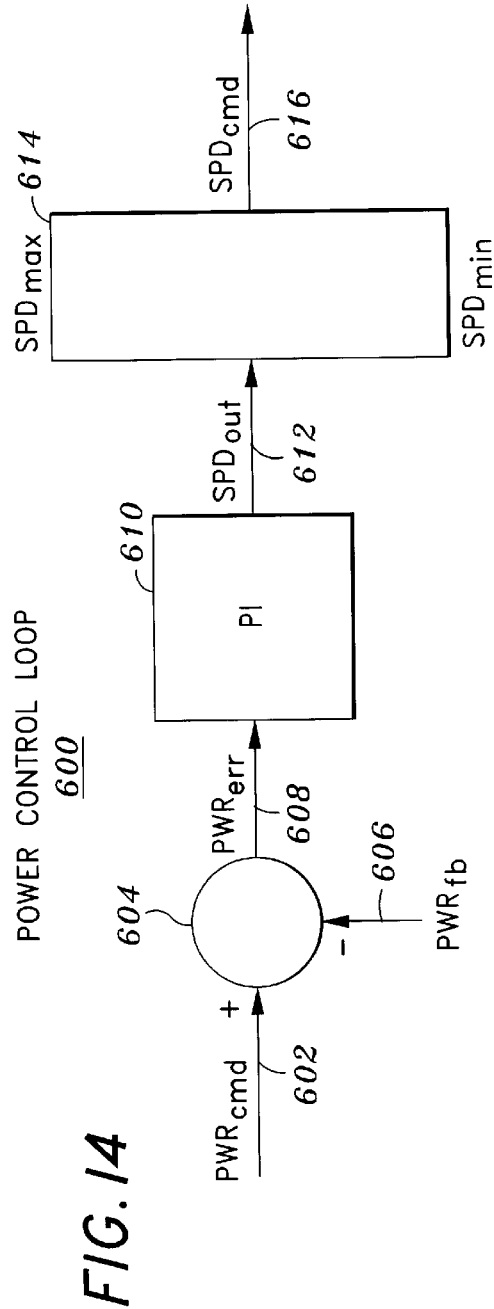
FIG. 14 is a block diagram of a power control mode loop for regulating the power producing potential of turbogenerator 358.

Referring to FIGS. 12–14, control loops 560, 582 and 600 may be used to regulate engine controls of turbine engine 448. These loops include exhaust gas temperature (EGT) control (FIG. 12), speed control (FIG. 13) and power control (FIG. 14). All three of the control loops 560, 582 and 600 may be used individually and collectively by main CPU 332 to provide the dynamic control and performance required by power controller logic 530. One or more of control loops 560, 582 and 600 may be joined together for different modes of operation.

The open-loop light off control algorithm is a programmed command of the fuel device, such as fuel control system 342, used to inject fuel until combustion begins. In one configuration, main CPU 332 takes a snap shot of the engine EGT and begins commanding the fuel device from about 0% to 25% of full command over about 5 seconds. Engine light is declared when the engine EGT rises about 28° C. (50° F.) from the initial snap shot.

Referring to FIG. 12, EGT control loop 560 provides various fuel output commands to regulate the temperature of the turbine engine 448. Engine speed signal 562 is used to determine the maximum EGT setpoint temperature 566 in accordance with predetermined setpoint temperature values illustrated in EGT vs. Speed Curve 564. EGT setpoint temperature 566 is compared by comparator 568 against feedback EGT signal 570 to determine EGT error signal 572, which is then applied to a proportional-integral (PI) algorithm 574 for determining the fuel command 576 required to regulate EGT at the setpoint. Maximum/minimum fuel limits 578 are used to limit EGT control algorithm fuel command output 576 to protect from integrator windup. Resultant EGT fuel output signal 580 is the regulated EGT signal fuel flow command. In operation, EGT control mode loop 560 operates at about a 100 ms rate.

Referring to FIG. 13, speed control mode loop 582 provides various fuel output commands to regulate the rotating speed of the turbine engine 448. Feedback speed signal 588 is read and compared by comparator 586 against setpoint speed signal 584 to determine error signal 590, which is then applied to PI algorithm 592 to determine the fuel command required to regulate turbine engine speed at the setpoint. EGT control (FIG. 12) and maximum/minimum fuel limits 596 are used in conjunction with the speed control algorithm 582 to protect output signal 594 from surge and flame out conditions. Resultant output signal 598 is regulated turbine speed fuel flow command. In one implementation, speed control mode loop 582 operates at about a 20 ms rate.

Referring to FIG. 14, power control loop 600 regulates the power producing potential of turbogenerator 358. Feedback power signal 606 is read and compared by comparator 604 against setpoint power signal 602 to determine power error signal 608, which is then applied to PI algorithm 610 to determine the speed command required to regulate output power at the setpoint. Maximum/minimum speed limits 614 are used to limit the power control algorithm speed command output to protect output signal 612 from running into over speed and under speed conditions. Resultant output signal 616 is regulated power signal turbine speed command. In one implementation, the maximum operating speed of the turbine engine is generally 96,000 RPM and the minimum operating speed of the turbine is generally 45,000 RPM. The loop operates generally at about a 500 ms rate.

Figure 16:
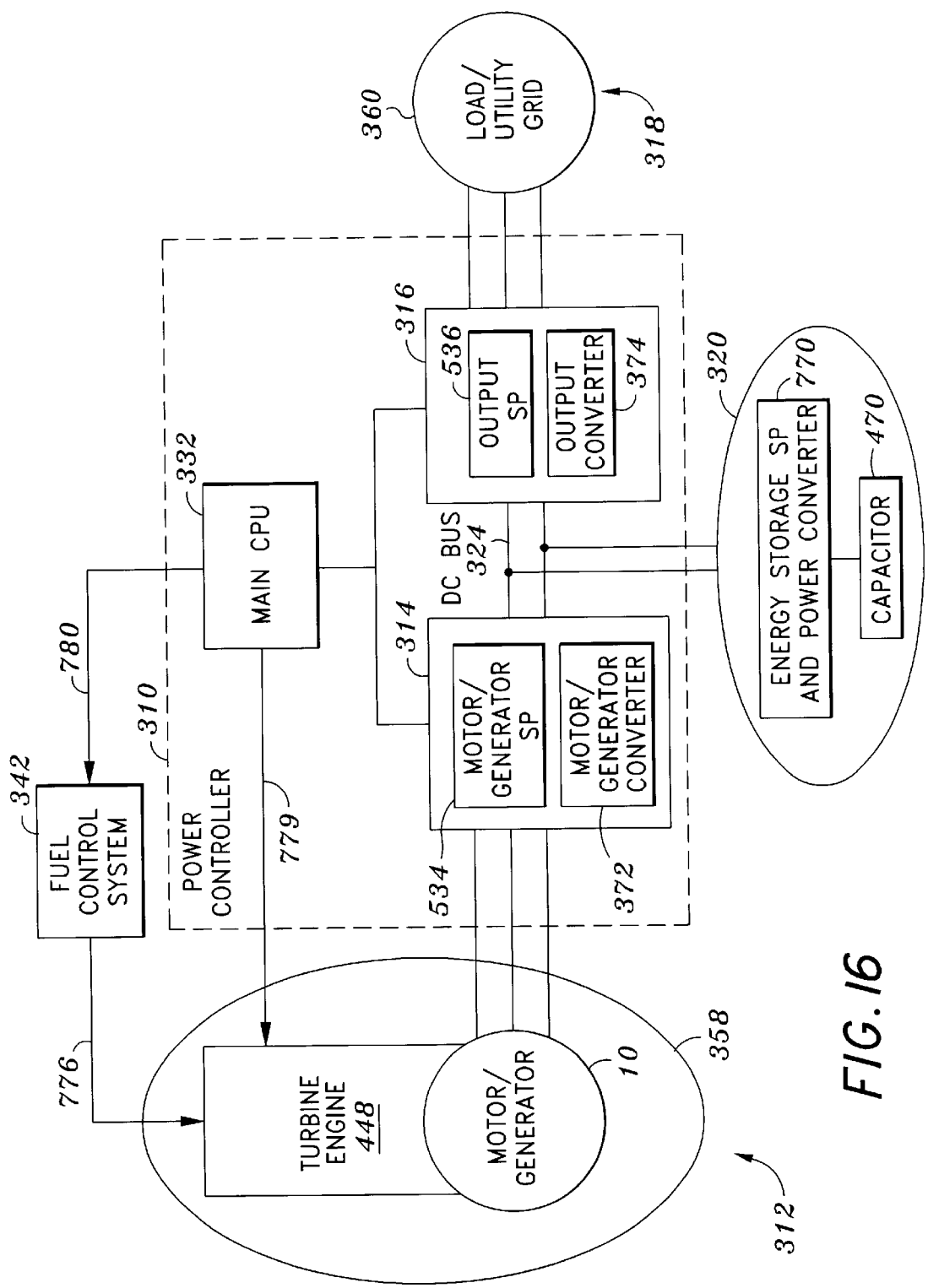
FIG. 16 is a block diagram of power controller 310 interfacing with a turbogenerator 358 and fuel control system 342.

Referring to FIG. 16, in the DC bus voltage control mode, the capacitor(s) 470 may provide energy to regulate voltage on DC bus 324 to the bus voltage setpoint command. Main CPU 332 commands the bus voltage on DC bus 324 to control at different voltage setpoint values depending on the configuration of power controller 310. In the state of charge (SOC) control mode, a recharging power demand may be provided. Available recharging power is generally equivalent to maximum engine power less power being supplied to the output load and system parasitic loads. Main CPU 332 transmits a recharging power level that is the minimum of the original power demand and available recharging power. The capacitor(s) provides the DC bus voltage control as described below as well as the state of charge (SOC) control mode.

In the DC Bus Voltage Control mode, DC bus 324 supplies power for logic power, external components and system power output. TABLE 1 defines exemplary bus voltage setpoints based on exemplary output power configurations of power controller 310:

TABLE 1

| POWER OUTPUT | SETPOINT |
| --- | --- |
| 480/400 VAC Output | 800 V DC |
| 240/208 VAC Output | 400 V DC |

In the various operating modes, power controller 310 will have different control algorithms responsible for managing the DC bus voltage level. Any of the options in energy storage SP and power converter 770 as well as SPs 534 and 536 have modes that control power flow to regulate the voltage level of DC bus 324.

Figure 15:
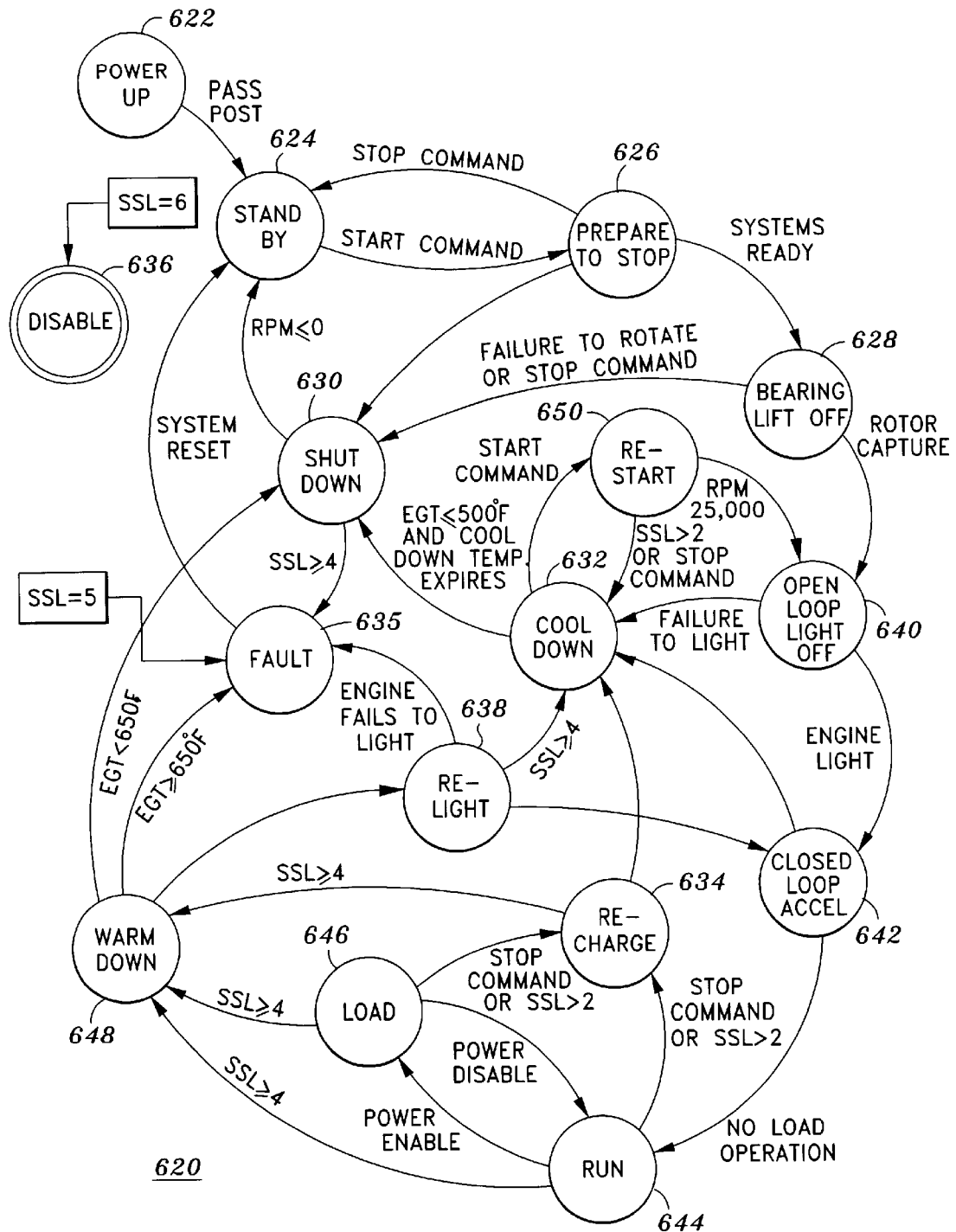
FIG. 15 is a state diagram showing various operating states of power controller 310.

Referring now also to FIG. 15, state diagram 620 showing various operating states of power controller 310 is illustrated. Sequencing the system through the entire operating procedure requires power controller 310 to transition through the operating states defined in TABLE 2.

TABLE 2

| STATE # | SYSTEM STATE | DESCRIPTION |
| --- | --- | --- |
| 622 | Power Up. | Performs activities of initializing and testing the system. Upon passing Power On Self Test (POST), move to Standby state 624. |
| 624 | Stand By. | Closes power to bus and continues system monitoring while waiting for a start command. Upon receipt of Start Command, move to Prepare to Start state 626. |
| 626 | Prepare to Start. | Initializes any external devices preparing for the start procedure. Returns to Stand By state 624 if Stop Command received. Moves to Shut Down state 630 if systems do not respond or if a fault is detected with a system severity level (SSL) greater than 2. Upon systems ready, move to Bearing Lift Off state 628. |
| 628 | Bearing Lift Off. | Configures the system and commands turbine engine 448 to be rotated to a predetermined RPM, such as 25,000 RPM. Moves to Shut Down state 630 upon failure of turbine engine 448 to rotate, or receipt of a Stop Command. Upon capture of rotor in motor/generator 10, moves to Open Loop Light Off state 640. |
| 640 | Open Loop Light Off. | Turns on ignition system and commands fuel open loop to light turbine engine 448. Moves to Cool Down state 632 upon failure to light. Upon turbine engine 448 light off, moves to Closed Loop Acceleration state 642. |
| 642 | Closed Loop Acceleration. | Continues motoring turbine engine 448 using closed loop fuel control until the turbogenerator system 200 reaches a predetermined RPM, designated as the No Load state. Moves to Cool Down state 632 upon receipt of Stop Command or if a fault occurs with a SSL greater than 2. Upon reaching No Load state, moves to Run state 644. |
| 644 | Run. | Turbine engine 448 operates in a no load, self-sustaining state producing power to operate the power controller 310. Moves to Warm Down state 648 if SSL is greater than or equal to 4. Moves to Re-Charge state 634 if Stop Command is received or if a fault occurs with a SSL greater than 2. Upon receipt of Power Enable command, moves to Load state 646. |
| 646 | Load. | Converter output contactor 510 is closed and turbogenerator system 200 is producing power applied to load 360. Moves to Warm Down state 648 if a fault occurs with a SSL greater or equal to 4. Moves to Run state 644 if Power Disable command is received. Moves to Re-Charge state 634 if Stop Command is received or if a fault occurs with a SSL greater than 2. |

TABLE 2-continued

| STATE # | SYSTEM STATE | DESCRIPTION |
|---|---|---|
| 634 | Re-Charge. | System operates off of fuel only and produces power for recharging energy storage device if installed, such as capacitor(s) 470 shown in FIG. 10. Moves to Cool Down state 622 when energy storage device is fully charged or if a fault occurs with a SSL greater than 2. Moves to Warm Down state if a fault occurs with a SSL greater than or equal to 4. |
| 632 | Cool Down. | Motor/Generator 10 is motoring turbine engine 448 to reduce EGT before moving to Shut Down state 630. Moves to Re-Start state 650 if Start Command received. Upon expiration of Cool Down Timer, moves to Shut Down state 630 when EGT is less than or equal to 500° F. |
| 650 | Re-Start. | Reduces speed of turbine engine 448 to begin open loop light off when a Start Command is received in the Cool Down state 632. Moves to Cool Down state 632 if Stop Command is received or if a fault occurs with a SSL greater than 2. Upon reaching RPM less than or equal to 25,000 RPM, moves to Open Loop Light Off state 640. |
| 638 | Re-Light. | Performs a re-light of turbine engine 448 during transition from the Warm Down state 648 to Cool Down state 632. Allows continued engine cooling when motoring is no longer possible. Moves to Cool Down state 632 if a fault occurs with a SSL greater than or equal to 4. Moves to Fault state 635 if turbine engine 448 fails to light. Upon light off of turbine engine 448, moves to Closed Loop Acceleration state 642. |
| 648 | Warm Down. | Sustains operation of turbine engine 448 with fuel at a predetermined RPM, such as 50,000 RPM, to cool turbine engine 448 when motoring of turbine engine 448 by motor/generator 10 is not possible. Moves to Fault state 635 if EGT is not less than 650° F. within a predetermined time. Upon achieving an EGT less than 650° F., moves to Shut Down state 630. |
| 630 | Shutdown. | Reconfigures turbogenerator system 200 after a cooldown in Cool Down state 632 or Warm Down state 648 to enter the Stand By state 624. Moves to Fault state 635 if a fault occurs with a SSL greater than or equal to 4. Moves to Stand By state 624 when RPM is less than or equal to zero. |
| 635 | Fault. | Turns off all outputs when a fault occurs with a SSL equal to 5 indicating that the presence of a fault which disables power conversion exists. Logic power is still available for interrogating system faults. Moves to Stand By state 624 upon receipt of System Reset. |
| 636 | Disable. | Fault has occurred where processing may no longer be possible. All system operation is disabled when a fault occurs with a SSL equal to 6. |

Main CPU 332 begins execution in Power Up state 622 after power is applied. Transition to Stand By state 624 is performed upon successfully completing the tasks of Power Up state 622. Initiating a start cycle transitions the system to Prepare to Start state 626 where all system components are initialized for an engine start of turbine engine 448. The turbine engine 448 then sequences through start states including Bearing Lift Off state 628, Open Loop Light Off state 640 and Closed Loop Acceleration state 642 and moves on to the "run/load" states, Run state 644 and Load state 646.

To shutdown the system, a stop command which sends the system into either Warm Down state 648 or Cool Down state 632 is initiated. Systems that have an energy reservoir such as capacitor(s) and/or a battery may enter Re-Charge state 634 prior to entering Warm Down state 648 or Cool Down state 632. When the system has finally completed the "warm down" or "cool down" process in Warm Down state 648 or Cool Down state 632, a transition through Shut Down state 630 will be made before the system re-enters Stand By state 624 awaiting the next start cycle. During any state, detection of a fault with a system severity level (SSL) equal to 5, indicating that the system should not be operated, will transition the system state to Fault state 635. Detection of faults with an SSL equal to 6 indicate a processor failure has occurred and will transition the system to Disable state 636.

In order to accommodate each mode of operation, the state diagram is multidimensional to provide a unique state for each operating mode. For example, in Prepare to Start state 626, control requirements will vary depending on the selected operating mode. Therefore, the presence of separate stand-alone Prepare to Start state 626, stand-alone transient Prepare to Start state 626, utility grid connect Prepare to Start state 626 and utility grid connect transient Prepare to Start state 626 may be required.

Each combination is known as a system configuration (SYSCON) sequence. Main CPU 332 identifies each of the different system configuration sequences in a 16-bit word known as a SYSCON word, which is a bit-wise construction of an operating mode and system state number. In one configuration, the system state number is packed in bits 0 through 11. The operating mode number is packed in bits 12 through 15. This packing method provides the system with the capability of sequence through 4096 different system states in 16 different operating modes.

Separate Power Up states 622, Re-Light states 638, Warm Down states 648, Fault states 635 and Disable states 636 may not be required for each mode of operation. The contents of these states are mode independent.

Power Up state 622 Operation of the system begins in Power Up state 622 once application of power activates main CPU 332. Once power is applied to power controller 310, all the hardware components will be automatically reset by hardware circuitry. Main CPU 332 is responsible for ensuring the hardware is functioning correctly and configuring the components for operation. Main CPU 332 also initializes its own internal data structures and begins execution by starting the Real-Time Operating System (RTOS). Successful completion of these tasks directs transition of the software to Stand By state 624. Main CPU 332 performs these procedures in the following order:

1. Initialize main CPU 332
2. Perform RAM Test
3. Perform FLASH Checksum
4. Start RTOS
5. Run Remaining POST
6. Initialize SPI Communications
7. Verify Motor/Generator SP Checksum
8. Verify Output SP Checksum
9. Initialize IntraController Communications
10. Resolve External Device Addresses
11. Look at Input Line Voltage
12. Determine Mode
13. Initialize Maintenance Port
14. Initialize User Port
15. Initialize External Option Port
16. Initialize InterController
17. Chose Master/Co-Master
18. Resolve Addressing
19. Transition to Stand By State (depends on operating mode)

Stand By state 624 Main CPU 332 continues to perform normal system monitoring in Stand By state 624 while it waits for a start command signal. Main CPU 332 commands either energy storage SP and power converter 770 or load/utility grid 360 to provide continuous power supply. In operation, main CPU 332 will often be left powered on waiting to be started or for troubleshooting purposes. While main CPU 332 is powered up, the software continues to monitor the system and perform diagnostics in case any failures should occur. All communications will continue to operate providing interface to external sources. A start command will transition the system to the Prepared to Start state 626.

Prepared to Start state 626 Main CPU 332 prepares the control system components for turbine engine 448 start process. Many external devices may require additional time for hardware initialization before the actual start procedure can commence. The Prepared to Start state 626 provides those devices the necessary time to perform initialization and send acknowledgment to main CPU 332 that the start process can begin. Once all systems are ready to go, the software will transition to the Bearing Lift Off state 628.

Bearing Lift Off state 628 Main CPU 332 commands motor/generator SP and power converter 456 314 to motor the turbine engine 448 from typically about 0 to 25,000 RPM to accomplish the bearing lift off procedure. A check is performed to ensure the shaft of turbine engine 448 is rotating before transition to the next state occurs.

Open Loop Light Off state 640 Once the motor/generator 10 reaches its liftoff speed, the software commences and ensures combustion is occurring in the turbine engine 448. In one configuration, main CPU 332 commands motor/generator SP and power converter 314 to motor the turbine engine 448 to a dwell speed of about 25,000 RPM. Execution of Open Loop Light Off state 640 starts combustion. Main CPU 332 then verifies that turbine engine 448 has not met the "fail to light" criteria before transition to the Closed Loop Acceleration state 642.

Closed Loop Acceleration state 642 Main CPU 332 sequences turbine engine 448 through a combustion heating process to bring turbine engine 448 to a self-sustaining operating point. In one configuration, commands are provided to motor/generator SP and power converter 314 commanding an increase in turbine engine speed to about 45,000 RPM at a rate of about 4000 RPM/sec. Fuel controls of fuel supply system 342 are executed to provide combustion and engine heating. When turbine engine 448 reaches "no load" (requires no electrical power to motor), the software transitions to Run state 644.

Run state 644 Main CPU 332 continues operation of control algorithms to operate turbine engine 448 at no load. Power may be produced from turbine engine 448 for operating control electronics and recharging any energy storage device, such as capacitor(s) 470, in energy storage SP and power converter 770 for starting. No power is output from output SP and power converter 316. A power enable signal transitions the software into Load state 646. A stop command transitions the system to begin shutdown procedures (may vary depending on operating mode).

Load state 646 Main CPU 332 continues operation of control algorithms to operate turbogenerator 358 at the desired load. Load commands are issued through the communications ports, display or system loads. A stop command transitions main CPU 332 to begin shutdown procedures (may vary depending on operating mode). A power disable signal can transition main CPU 332 back to Run state 644.

Re-charge state 634 Systems that have an energy storage option may be required to charge the energy storage device, such as capacitor(s) 470, in energy storage SP and power converter 770 to maximum or lower capacity before entering Warm Down state 648 or Cool Down state 632. During Recharge state 634, main CPU 332 continues operation of the turbogenerator 358 producing power for energy reservoir charging and power controller 310. No output power is provided. When energy storage device 470 has been charged, the system transitions to either Cool Down state 632 or Warm Down state 648, depending on system fault conditions.

Cool Down state 632 Cool Down state 632 provides the ability to cool the turbine engine 448 after operation and a means of purging fuel from the combustor. After normal operation, software sequences the system into Cool Down state 632. In one configuration, turbine engine 448 is motored to a cool down speed of about 45,000 RPM. Airflow continues to move through turbine engine 448 preventing hot air from migrating to mechanical components in the cold section. This motoring process continues until the turbine engine EGT falls below a cool down temperature of about 193° C. (380° F.). Cool Down state 632 may be entered at much lower than the final cool down temperature when turbine engine 448 fails to light. The engine's combustor of turbine engine 448 requires purging of excess fuel which may remain. The software operates the cool down cycle for a minimum purge time of 60 seconds. This purge time ensures remaining fuel is evacuated from the combustor. Completion of this process transitions the system into Shut Down state 630. For user convenience, the system does not require a completion of the entire Cool Down state 632 before being able to attempt a restart. Issuing a start command transitions the system into Restart state 650.

Restart state 650 In Restart state 650, turbine engine 448 is configured from Cool Down state 632 before turbine engine 448 can be restarted. In one configuration, the software lowers the speed of turbine engine 448 to about 25,000 RPM at a rate of 4,000 RPM/sec. Once the turbine engine speed has reached this level, the software transitions the system into Open Loop Light Off state 640 to perform the actual engine start.

Shutdown state 630 During Shut Down state 630, the turbine engine and motor/generator rotor shaft is brought to rest and system outputs are configured for idle operation. In one configuration, the software commands the rotor shaft to rest by lowering the turbine engine speed at a rate of 2,000 RPM/sec or no load condition, whichever is faster. Once the speed reaches about 14,000 RPM, the motor/generator SP and power converter 314 is commanded to reduce the shaft speed to about 0 RPM in less than 1 second.

Re-light state 638 When a system fault occurs where no power is provided from the load/utility grid 360 or energy storage SP and power converter 770, the software re-ignites combustion to perform Warm Down state 648. The motor/generator SP and power converter 314 is configured to regulate voltage (power) for the internal DC bus. Fuel is added in accordance with the open loop light off fuel control algorithm in Open Loop Light Off state 640 to ensure combustion occurs. Detection of engine light will transition the system to Warm Down state 648.

Warm Down State 648 Fuel is provided, when no electric power is available to motor turbine engine 448 at a no load condition, to lower the operating temperature in Warm Down state 648. In one configuration, engine speed is operated at about 50,000 RPM by supplying fuel through the speed control algorithm described above with regard to FIG. 13. EGT temperatures of turbine engine 448 less than about 343° C. (650° F.) causes the system to transition to Shut Down state 630.

Fault state 635 The system disables all outputs placing the system in a safe configuration when faults that prohibit safe operation of the turbine system are present. Operation of system monitoring and communications may continue if the energy is available.

Disable State 636 The system disables all outputs placing the system in a safe configuration when faults that prohibit safe operation of the turbine system are present. System monitoring and communications may not continue.

Modes of Operation The turbine works in two major modes—utility grid-connect and stand-alone. In the utility grid-connect mode, the electric power distribution system, i.e., the utility grid of load/utility grid 360, supplies a reference voltage and phase, and turbogenerator 358 supplies power in synchronism with the utility grid. In the stand-alone mode, turbogenerator 358 supplies its own reference voltage and phase, and supplies AC or DC power directly to the load. The power controller 310 switches automatically between the modes.

Within the two major modes of operation are sub-modes. These modes include stand-alone black start, stand-alone transient, utility grid connect and utility grid connect transient. The criterion(ria) for selecting an operating mode is based on numerous factors, including but not limited to, the presence of voltage on the output terminals, the black start capacitor option, and the transient capacitor option.

Referring to FIG. 16, motor/generator SP and power converter 314 and output SP and power converter 316 provide an interface for energy source 312 and utility/load 318, respectively, to DC bus 324. For illustrative purposes, energy source 312 is turbogenerator 358 including turbine engine 448 and motor/generator 10. Fuel control system 342 provides fuel via fuel line 776 to turbine engine 448.

Motor/generator power converter 314, which may include motor/generator SP 534 and motor/generator converter 372, and output power converter 316, which may include output SP 536 and output converter 374, operate as customized bi-directional, switching power converters under the control of main CPU 332. In particular, main CPU 332 reconfigures the motor/generator power converter 314 and output power converter 316 into different configurations to provide for the various modes of operation. These modes include stand-alone black start, stand-alone transient, utility grid connect and utility grid connect transient as discussed in detail below.

Power controller 310 controls the way in which motor/generator 10 and load/utility grid 360 sinks or sources power, and DC bus 324 is regulated, at any time. In this way, energy source 320, which may include energy storage SP and converter 770 and capacitor(s) 470, and load/utility grid 360 can be used to supply, store and/or use power in an efficient manner. Main CPU 332 provides command signals via line 779 to turbine engine 448 to determine the speed of turbogenerator 358. The speed of turbogenerator 358 is maintained through motor/generator 10. Main CPU also provides command signals via fuel control line 780 to fuel control system 342 to maintain the EGT of turbine engine 448 at its maximum efficiency point. Motor/generator SP 534, operating motor/generator converter 372, is responsible for maintaining the speed of turbogenerator 358, by putting current into or pulling current out of motor/generator 10.

Stand-alone Black Start Referring to FIG. 16, in the stand-alone black start mode, the energy storage device associated with energy storage and SP 770, such as capacitor(s) 470, is provided for starting purposes while energy source 312, such as turbine engine 448 and motor/generator 10, supplies all transient and steady state energy. Referring to TABLE 3, controls for one embodiment of a stand-alone black start mode are shown.

TABLE 3

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop | RPM | — | DC Bus |
| Closed Loop Accel | EGT | RPM | — | DC Bus |
| Run | Speed | DC Bus | — | SOC |
| Load | Speed | DC Bus | Voltage | SOC |
| Recharge | Speed | DC Bus | — | SOC |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Stand-alone Transient In the stand-alone transient mode, energy source 320, including energy storage SP and converter 770 as well as capacitor(s) 470, are provided for the purpose of starting and assisting the energy source 312, in this example turbogenerator 358 including turbine engine 448 and motor/generator 10, to supply maximum rated output power during transient conditions. Storage device 470, typically one or more capacitors, is attached to DC bus 324 during operation, supplying energy in the form of current to maintain the voltage on DC bus 324. Power converter 316, including output SP 536 and output converter 374, provides a constant voltage source when producing output power. As a result, load/utility grid 360 is always supplied the proper AC or DC voltage value that it requires. Referring to TABLE 4, controls for one embodiment of a stand-alone transient mode are shown.

TABLE 4

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop | RPM | — | DC Bus |
| Closed Loop Accel | EGT | RPM | — | DC Bus |
| Run | Power & EGT | RPM | — | DC Bus |
| Load | Power & EGT | RPM | Voltage | DC Bus |
| Recharge | Power & EGT | RPM | — | DC Bus |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Utility Grid Connect Referring to FIG. 16, in the utility grid connect mode, the energy source 312, in this example turbogenerator 358 including turbine engine 448 and motor/generator 10, is connected to the load/utility grid 360 providing load leveling and management where transients are handled by the load/utility grid 360. The system operates as a current source, pumping current into load/utility grid 360. Referring to TABLE 5, controls for one embodiment of a utility grid connect mode are shown.

TABLE 5

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | N/A |
| Stand By | — | — | — | N/A |
| Prepare to Start | — | — | DC Bus | N/A |
| Bearing Lift Off | — | RPM | DC Bus | N/A |
| Open Loop Light Off | Open Loop | RPM | DC Bus | N/A |
| Closed Loop Accel | EGT | RPM | DC Bus | N/A |
| Run | Power & EGT | RPM | DC Bus | N/A |
| Load | Power & EGT | RPM | DC Bus | N/A |
| Recharge | N/A | N/A | N/A | N/A |
| Cool Down | — | RPM | DC Bus | N/A |
| Restart | — | RPM | DC Bus | N/A |
| Shutdown | — | RPM | DC Bus | N/A |
| Re-light | Speed | DC Bus | — | N/A |
| Warm Down | Speed | DC Bus | — | N/A |
| Fault | — | — | — | N/A |
| Disable | — | — | — | N/A |

Utility Grid Connect Transient In the utility grid connect transient mode, energy source 312, in this example turbogenerator 358 including turbine engine 448 and motor/generator 10, is connected to the load/utility grid 360 providing load leveling and management. The turbine engine 448 that is assisted by energy source 320 including energy storage SP and converter 770 and typically an energy storage device such as capacitor(s) 470 handles transients. The system operates as a current source, pumping current into load/utility grid 360 with the assistance of energy storage SP and converter 770. Referring to TABLE 6, controls for one embodiment of a utility grid connect transient mode are shown.

TABLE 6

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop | RPM | — | DC Bus |
| Closed Loop Accel | EGT | RPM | — | DC Bus |
| Run | Power & EGT | RPM | — | DC Bus |
| Load | Power & EGT | RPM | Current | DC Bus |
| Recharge | Power & EGT | RPM | — | DC Bus |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Multi-pack Operation The power controller can operate in a single or multi-pack configuration. In particular, power controller 310, in addition to being a controller for a single turbogenerator, is capable of sequencing multiple turbogenerator systems as well. Referring to FIG. 17, for illustrative purposes, multi-pack system 810 including three power controllers 818, 820 and 822 is shown. The ability to control multiple power controllers 818, 820 and 822 is made possible through digital communications interface and control logic contained in each controller's main CPU (not shown).

Two communications busses 830 and 834 are used to create the intercontroller digital communications interface for multi-pack operation. One bus 834 is used for slower data exchange while the other bus 830 generates synchronization packets at a faster rate. In a typical implementation, for example, an IEEE-502.3 bus links each of the controllers 818, 820 and 822 together for slower communications including data acquisition, start, stop, power demand and mode selection functionality. An RS485 bus links each of the systems together providing synchronization of the output power waveforms.

The number of power controllers that can be connected together is not limited to three, but rather any number of controllers can be connected together in a multi-pack configuration. Each power controller 818, 820 and 822 includes its own energy storage device 824, 826 and 828, respectively, such as one or more electrochemical, hybrid, etc. capacitors. In accordance with another embodiment, power controllers 818, 820 and 822 can all be connected to the same single energy storage device (not shown), typically a very large energy storage device which may be rated too big for an individual turbine. Distribution panel 832, typically comprised of circuit breakers, provides for distribution of energy.

Multi-pack control logic determines at power up that one controller is the master and the other controllers become slave devices. The master is in charge of handling all user-input commands, initiating all inter-system communications transactions, and dispatching units. While all controllers 818, 820 and 822 contain the functionality to be a master, to alleviate control and bus contention, one controller is designated as the master.

At power up, the individual controllers 818, 820 and 822 determine what external input devices they have connected. When a controller contains a minimum number of input devices it sends a transmission on intercontroller bus 830 claiming to be master. All controllers 818, 820 and 822 claiming to be a master begin resolving who should be master. Once a master is chosen, an address resolution protocol is executed to assign addresses to each slave system. After choosing the master and assigning slave addresses, multi-pack system 810 can begin operating.

A co-master is also selected during the master and address resolution cycle. The job of the co-master is to act like a slave during normal operations. The co-master should receive a constant transmission packet from the master indicating that the master is still operating correctly. When this packet is not received within a safe time period, 20 ms for example, the co-master may immediately become the master and take over master control responsibilities.

Logic in the master configures all slave turbogenerator systems. Slaves are selected to be either utility grid-connect (current source) or stand alone (voltage source). A master controller, when selected, will communicate with its output converter logic (output SP) that this system is a master. The output SP is then responsible for transmitting packets over the intercontroller bus 830, synchronizing the output waveforms with all slave systems. Transmitted packets will include at least the angle of the output waveform and error-checking information with transmission expected every quarter cycle to one cycle.

Master control logic will dispatch units based on one of three modes of operation: (1) peak shaving, (2) load following, or (3) base load. Peak shaving measures the total power consumption in a building or application using a power meter, and the multi-pack system 810 reduces the utility consumption of a fixed load, thereby reducing the utility rate schedule and increasing the overall economic return of the turbogenerator. Load following is a subset of peak shaving where a power meter measures the total power consumption in a building or application and the multi-pack system 810 reduces the utility consumption to zero load. In base load, the multi-pack system 810 provides a fixed load and the utility supplements the load in a building or application. Each of these control modes require different control strategies to optimize the total operating efficiency.

A minimum number of input devices are typically desired for a system 810 to claim it is a master during the master resolution process. Input devices that are looked for include a display panel, an active RS232 connection and a power meter connected to the option port. Multi-pack system 810 typically requires a display panel or RS232 connection for receiving user-input commands and power meter for load following or peak shaving.

The master control logic dispatches controllers based on operating time. This would involve turning off controllers that have been operating for long periods of time and turning on controllers with less operating time, thereby reducing wear on specific systems.

Utility Grid Analysis and Transient Ride Through

Figure 18:
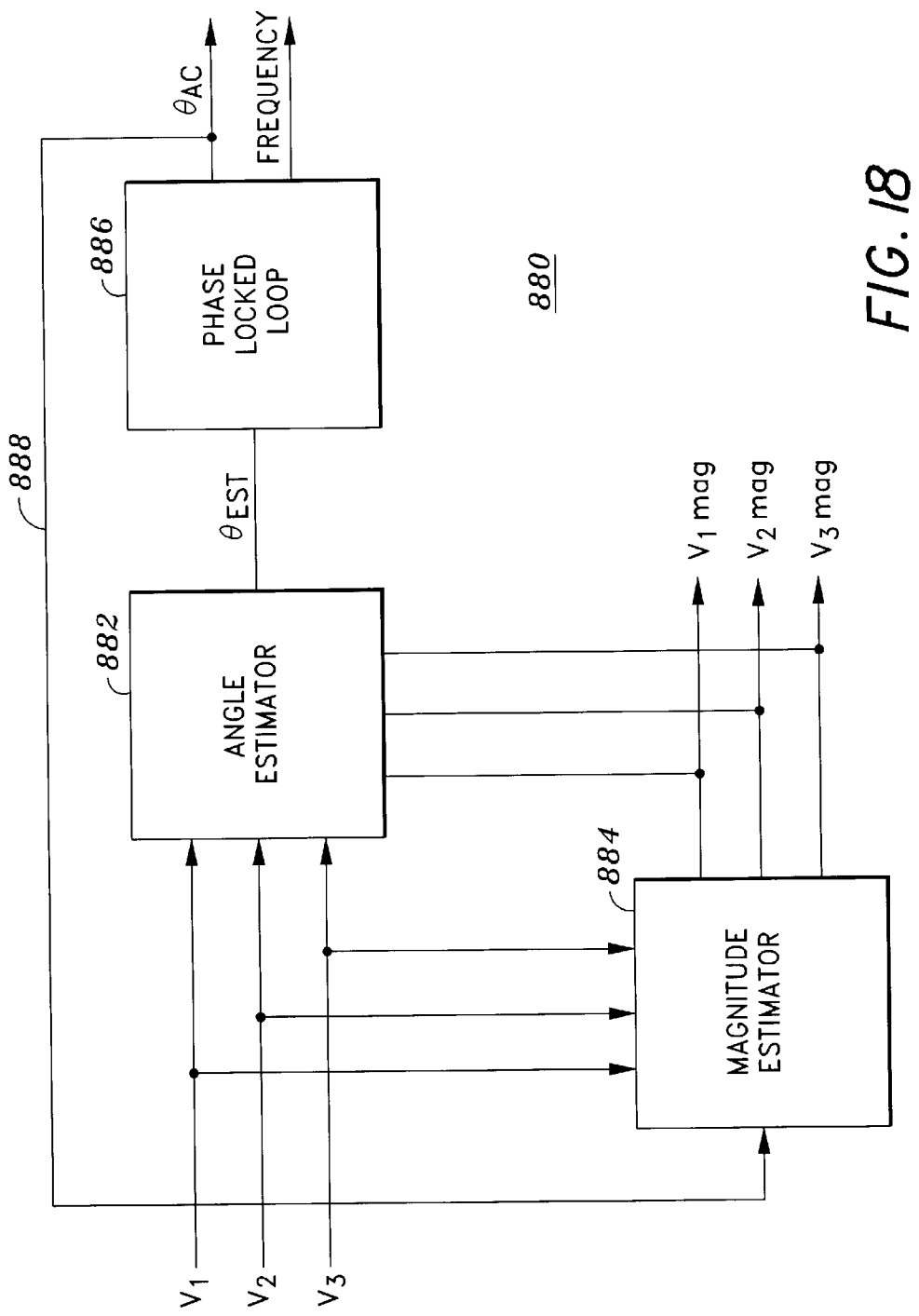
FIG. 18 is a block diagram of a utility grid analysis system for the power controller 310.
Figure 19:
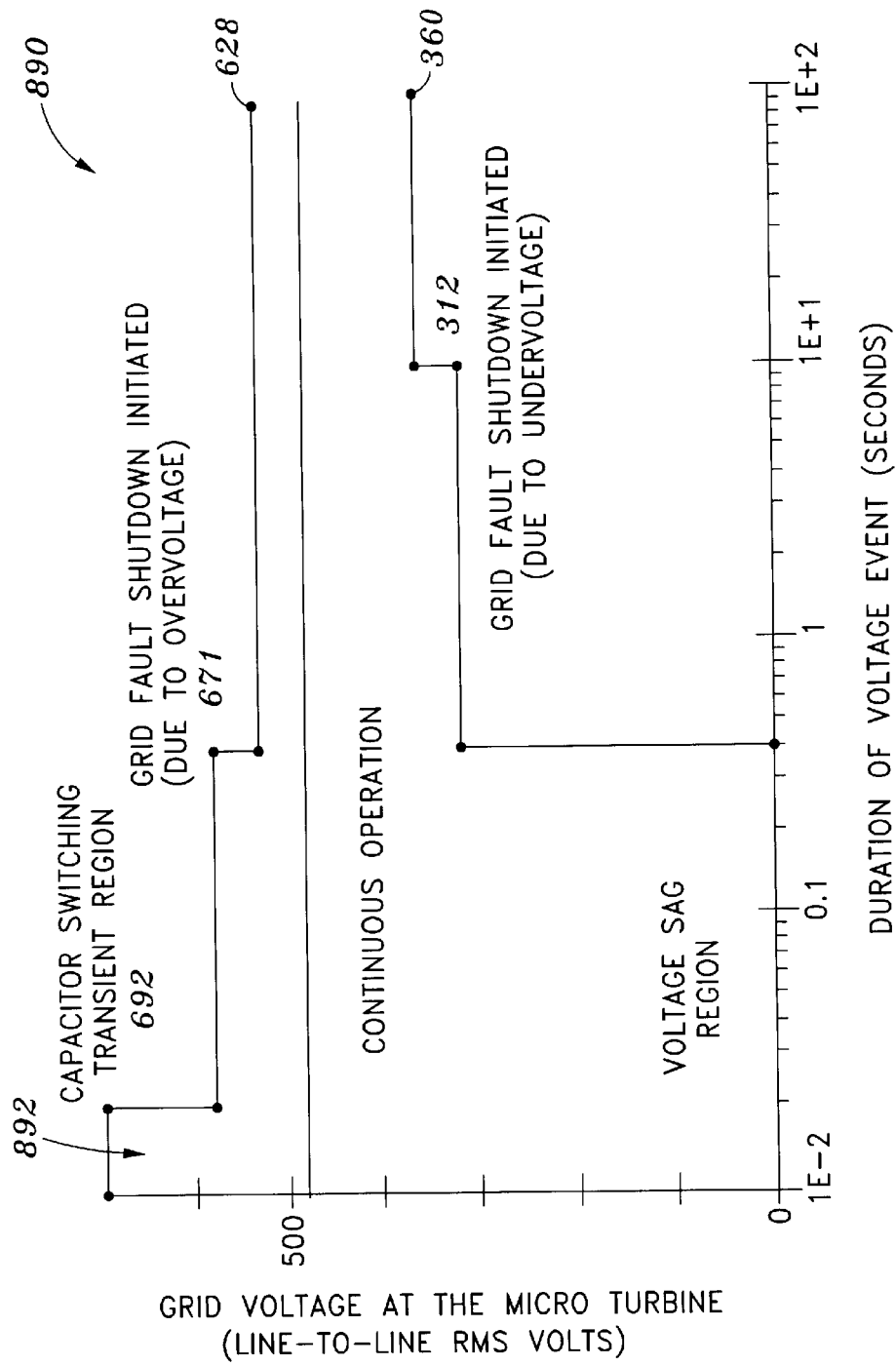
FIG. 19 is a graph of voltage against time for the utility grid analysis system illustrated in FIG. 18.

Referring to FIGS. 18–20, a transient handling system 880 for power controller 310 is illustrated. Transient handling system 880 allows power controller 310 to ride through transients which are associated with switching of correction capacitors (not shown) on load/utility grid 360 which causes voltage spikes followed by ringing. Transient handling system 880 also allows ride through of other faults, including but not limited to, short circuit faults on load/utility grid 360, which cleared successfully, cause voltage sags. Transient handling system 880 is particularly effective towards handling transients associated with digital controllers, which generally have a slower current response rate due to A/D conversion sampling. During a transient, a large change in the current can occur in between A/D conversions. The high voltage impulse caused by transients typically causes an over current in digital power controllers.

As is illustrated in FIG. 19, a graph 890 showing transients typically present on load/utility grid 360 is shown. The duration of a voltage transient, and measured in seconds, is shown on the x-axis and its magnitude, measured in volts, is shown on the y-axis.

Referring to FIGS. 18–20, changes on load/utility grid 360 are reflected as changes in the magnitude of the voltage. In particular, the type and seriousness of any fault or event on load/utility grid 360 can be determined by magnitude estimator 884, which monitors the magnitude and duration of any change on load/utility grid 360.

The effect of voltage transients can be minimized by monitoring the current such that when it exceeds a predetermined level, switching is stopped so that the current can decay, thereby preventing the current from exceeding its predetermined level. The embodiment thus takes advantage of analog over current detection circuits that have a faster response than transient detection based on digital sampling of current and voltage. Longer duration transients indicate abnormal utility grid conditions. These must be detected so power controller 310 can shut down in a safe manner. Algorithms used to operate power controller 310 provide protection against islanding of power controller 310 in the absence of utility-supplied grid voltage. Near short or near open islands are detected within milliseconds through loss of current control. Islands whose load is more closely matched to the power controller output will be detected through abnormal voltage magnitudes and frequencies as detected by magnitude estimator 884.

In particular, referring to FIG. 20, power controller 310 includes brake resistor 912 connected across DC bus 324. Brake resistor 912 acts as a resistive load, absorbing energy when output converter 374 is turned off under the direction of output SP 536. In operation, when output converter 374 is turned off, power is no longer exchanged with load/utility grid 360, but power is still being received from motor/generator 10 within turbogenerator 358, which power is then absorbed by brake resistor 912. The power controller 310 detects the DC voltage on DC bus 324 between motor/generator converter 372 and output converter 374. When the voltage starts to rise, brake resistor 912 may be turned on to allow it to absorb energy.

In one configuration, motor/generator produces three phases of AC at variable frequencies. Motor/generator converter 372, under the control of motor/generator SP 534, converts the AC from motor/generator 10 to DC which is then applied to DC bus 324 (regulated for example at 800 V DC) which is supported by capacitor 910 (for example, at 800 microfarads with two milliseconds of energy storage). Output converter 374, under the control of output SP 536, converts the DC on DC bus 324 into three-phase AC (or stepped-up or stepped-down DC), and applies it to load/utility grid 360.

Current from DC bus 324 can by dissipated in brake resistor 912 via modulation of switch 914 operating under the control of motor/generator SP 534. Switch 914 may be an IGBT switch, although other conventional or newly developed switches may be utilized as well.

Motor/generator SP 534 controls switch 914 in accordance to the magnitude of the voltage on DC bus 324. The bus voltage of DC bus 324 is typically maintained by output converter 374, under the direction of output SP 536, which shuttles power in and out of load/utility grid 360 to keep DC bus 324 regulated at, for example, 800 V DC. When output converter 374 is turned off, it no longer is able to maintain the voltage of DC bus 324, so power coming in from motor/generator 10 causes the bus voltage of DC bus 324 to rise quickly. The rise in voltage is detected by motor/generator SP 534, which turns on brake resistor 912 via switch 914 and modulates it on and off until the bus voltage is restored to its desired voltage, for example, 800 V DC. Output SP 536 detects when the utility grid transient has dissipated, i.e., AC current has decayed to zero and restarts output converter 374 of power controller 310. Brake resistor 912 is sized so that it can ride through the transient and the time taken to restart output converter 374.

Referring to FIGS. 16 and 18, both the voltage and zero crossings (to determine where the AC waveform of load/utility grid 360 crosses zero) are monitored to provide an accurate model of load/utility grid 360. Utility grid analysis system 880 includes angle estimator 882, magnitude estimator 884 and phase locked loop 886. The system 880 continuously monitors utility grid voltage and based on these measurements, estimates the utility grid angle, thus facilitating recognition of under/over voltages and sudden transients. Current limits are set to disable output converter 374 when current exceeds a maximum and wait until current decays to an acceptable level. The result of measuring the current and cutting it off is to allow output converter 374 to ride through transients better. Thus when output converter 374 is no longer exchanging power with utility grid 360, power is dissipated in brake resistor 912.

Output SP 536 is capable of monitoring the voltage and current at load/utility grid 360 simultaneously. In particular, power controller 310 includes a utility grid analysis algorithm. Estimates of the utility grid angle and magnitude may be derived via conventional algorithms or means. The true utility grid angle $\theta_{AC}$, which is the angle of the generating source, cycles through from 0 to $2\pi$ and back to 0 at a rate of 60 hertz. The voltage magnitude estimates of the three phases are designated V1 mag, V2 mag and V3 mag and the voltage measurement of the three phases are designated V1, V2 and V3.

A waveform, constructed based upon the estimates of the magnitude and angle for each phase, indicates what a correct measurement would look like. For example, using the first of the three phase voltages, the cosine of the true utility grid angle $\theta_{AC}$ is multiplied by the voltage magnitude estimate V1 mag, with the product being a cosine-like waveform. Ideally, the product would be voltage measurement V1.

Feedback loop 888 uses the difference between the absolute magnitude of the measurement of V1 and of the constructed waveform to adjust the magnitude of the magnitude estimate V1 mag. The other two phases of three-phase signal can be adjusted similarly, with different angle templates corresponding to different phases of the signal. Thus, magnitude estimate V1 mag and angle estimate $\theta_{EST}$ are used to update magnitude estimate V1 mag. Voltage magnitude estimates V1 mag, V2 mag and V3 mag are steady state values used in a feedback configuration to track the magnitude of voltage measurements V1, V2 and V2. By dividing the measured voltages V1 by the estimates of the magnitude V1 mag, the cosine of the angle for the first phase can be determined (similarly, the cosine of the angles of the other signals will be similarly determined).

The most advantageous estimate for the cosine of the angle, generally the one that is changing the most rapidly, is chosen to determine the instantaneous measured angle. In most cases, the phase that has an estimate for the cosine of an angle closest to zero is selected since it yields the greatest accuracy. Utility grid analysis system 880 thus includes logic to select which one of the cosines to use. The angle chosen is applied to angle estimator 882, from which an estimate of the instantaneous angle $\theta_{EST}$ of load/utility grid 360 is calculated and applied to phase locked loop 886 to produce a filtered frequency. The angle is thus differentiated to form a frequency that is then passed through a low pass filter (not shown). Phase locked loop 886 integrates the frequency and also locks the phase of the estimated instantaneous angle $\theta_{EST}$, which may have changed in phase due to differentiation and integration, to the phase of true utility grid angle $\theta_{AC}$.

In one operation, when the phase changes suddenly on measured voltage V1, the algorithm compares the product of the magnitude estimate V1 mag and the cosine of true utility grid angle $\theta_{AC}$ against the real magnitude multiplied by the cosine of a different angle. A sudden jump in magnitude would be realized.

Thus, three reasonably constant DC voltage magnitude estimates are generated. A change in one of those voltages indicates whether the transient present on load/utility grid 360 is substantial or not. There are a number of ways to determine whether a transient is substantial or not, i.e., whether abnormal conditions exist on the utility grid system, which require power controller 310 to shut down. A transient can be deemed substantial based upon the size of the voltage magnitude and duration. Examples of the criteria(rion) for shutting down power controller 310 are shown in FIG. 19. Detection of abnormal utility grid behavior can also be determined by examining the frequency estimate.

On detecting abnormal utility grid behavior, a utility grid fault shutdown is initiated. When power controller 310 initiates a utility grid fault shutdown, output contactor 510, shown in FIG. 10, is opened within a predetermined period of time, for example, 100 msec, and fuel cutoff solenoids 498 are closed, removing fuel from turbogenerator 358. A warm shutdown ensues during which control power is supplied from motor/generator 10 as it slows down. In one configuration, the warm-down lasts about 1–2 minutes before the rotor (not shown) is stopped. The control software does not allow a restart until utility grid voltage and frequency are within permitted limits.

Transient Ride-Through/Load Leveling Power Distribution/Generation System

Figure 21:
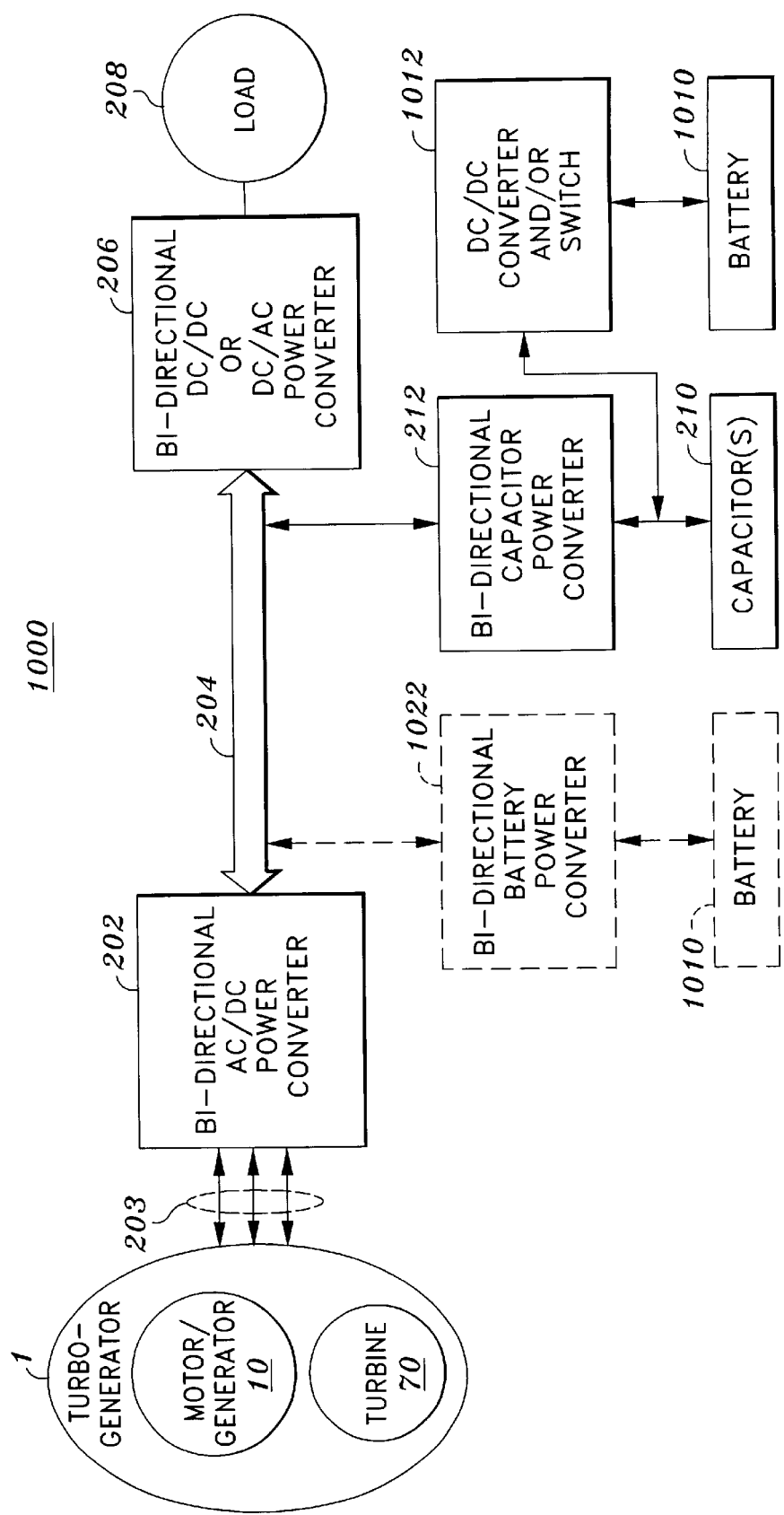
FIG. 21 illustrates a partial block diagram of the turbogenerator 1 and power controller 201 of FIG. 2, according to another embodiment.

FIG. 21 illustrates a partial block diagram of the turbogenerator 1 and power controller 201 of FIG. 2, according to another embodiment. The power distribution/generation system 1000 includes the turbogenerator 1, which yields very low emissions and high thermal efficiency, and capacitor(s) 210 and battery 1010 capable of delivering high power for predetermined amounts of time to handle load changes, which may occur in numerous applications such as in stand-alone (off-grid) applications.

Referring to FIG. 21, power controller 201 includes, among other devices not shown in this figure, bidirectional, configurable power converters 202 and 206 coupled together by DC bus 204. Bi-directional, configurable power converter 212 is coupled between capacitor(s) 210 and the DC bus 204. The power converter 212 may be contained internal or external to the power controller 201. The capacitor(s) 210 may be any type of capacitor such as an electrolytic capacitor, electrochemical capacitor (e.g., super-capacitor, ultra-capacitor), hybrid capacitor (such as, for example, a Hybrid® capacitor manufactured and sold by Evans Capacitor Company of East Providence, R.I.), etc., and combinations thereof.

The system also includes a battery 1010 which may be coupled to the DC bus 204 in a number of configurations. In one embodiment, the battery 1010 is coupled across capacitor(s) 210 by way of DC/DC converter and/or switch 1012. If the voltage rating of the battery 1010 is different than the voltage rating of the capacitor(s) 210, then a DC/DC converter and switch 1012 may be used to match the voltage on the capacitor(s) 210. If the voltage rating of the battery 1010 is the same as the voltage rating of the capacitor(s) 210, then a switch 1012 may be used to couple/decouple the battery 1010 across the capacitor(s) 210, under control of the power controller 201. In another embodiment, as shown using dashed lines, the battery 1010 is coupled to the DC bus 204 via a separate power converter 1022. In this embodiment, the power controller 201 utilizes the power converter 1022 to controllably couple the battery 1010 to the DC bus 204. The DC/DC converter and/or switch 1012 or power converter 1022 may be contained internal or external to the power controller 201.

In operation, turbogenerator 1 generates AC power on signal lines 203. The power controller 201 configures the power converter 202 to convert the AC power to DC power on DC bus 204. The DC voltage on DC bus 204 may be set to any voltage level such as, for example, 400 V DC, 800 V DC, etc. The power controller 201 controls power converter 206 to convert the DC power on DC bus 204 to either AC or DC power for coupling to the load 208, depending on whether the load 208 is an AC load or a DC load. For example, the power distribution system 1000 may be utilized to power a building, vehicle, etc. For an AC load, the power converter 206 may supply 3-phase AC power to the load. For a DC load, the power converter 206 may step up or step down the DC voltage on DC bus 204 to a desired voltage level.

The capacitor(s) 210 and battery 1010 are controllably coupled across the DC bus 204 under control of the power controller 201. In the first exemplary embodiment, power controller 201 operates the bidirectional power converter 212 and DC/DC converter and/or switch 1012 to couple the capacitor(s) 210 and battery 1010 to the DC bus 204 to handle (e.g., rapid) load changes and stabilize the DC voltage on DC bus 204 by either sourcing current to or sinking current from the DC bus 204. In the second exemplary embodiment, the power controller 201 operates power converters 212 and 1022 to couple the capacitor 210 and battery 1010 to the DC bus 204 to stabilize the DC voltage on the DC bus 204. In either embodiment, one or both of power converters 212 and 1022 may step up or step down the voltage rating of the capacitor 210 and battery 1010, respectively, to match the voltage on the DC bus 204. Additionally, the power converters 212 and 1022 may function to accommodate any decrease in terminal voltage of the capacitor 210 and battery 1010, respectively, as it discharges.

In one embodiment, the capacitor 210 is an electrochemical capacitor such as a super-capacitor, ultra-capacitor, etc. which provides high power and energy density and high cycle life. In another embodiment, the capacitor 210 may be a hybrid capacitor such as a tantalum hybrid capacitor, as described in U.S. Pat. No. 5,369,547, which may provide an increase in energy density compared to a conventional tantalum electrolytic capacitor. The electrochemical or hybrid capacitor may be capable of high voltages without the need to connect multiple series connected cells. In one exemplary application, a 54 V, 18 mF tantalum hybrid capacitor may be used to provide 200 $\mu$s, 150 A discharges, which provides a peak power level of 8100 Watts, at a repetition rate of 50 Hz. It is to be appreciated that any type of capacitor or combination of capacitors may be used as the energy source 210. Additionally, more than one capacitor may be used in one or more configurations for sourcing and sinking current during load changes. Moreover, the battery 1010 may be a low voltage, high energy battery. For example, the battery 1010 may be a lead acid-type battery.

In low-load conditions, where the power needed by the load 208 is less than the maximum electrical power output of the turbogenerator 1, the electric power needed by the load 208 is generated by the turbogenerator 1, under control of the power controller 201. When an on-load occurs or when an increase in load occurs (e.g., the load's power requirements exceed the available output power of the turbogenerator 1), the power controller 201 accelerates the turbogenerator 1 to supply the increased load. The power controller 201 also couples the capacitor(s) 210 and battery 1010 across the DC bus 204 to supply instantaneous power to the DC bus 204 and load 208. After the turbogenerator 1 reaches the necessary speed to sustain the increased load, one or both of the capacitor(s) 210 and battery 1010 may be recharged. In one embodiment, the capacitor 210 may be recharged to a nominal level less than 100% such as, for example, 80%. Of course, the capacitor 210 can be fully charged.

When an off-load or a decrease in load occurs (e.g., the load's power requirements is less than the available output power of the turbogenerator 1), the power controller 201 decelerates the turbogenerator 1 to meet the new lower demand of the load 208. During this transient condition, where excess energy is being generated by the turbogenerator 1, the excess energy may be absorbed by the capacitor 210 so that the system 1000 is able to operate without shutting down. The excess energy may also be absorbed, in addition to or in lieu of the capacitor 210, by the brake resistor 214 (FIG. 2).

During start up, the energy needed to start the motor/generator 10 and power the electronics may come from capacitor 210. In the start up mode, the power controller 201 (i) disables the power converter 206 to isolate the load 208 from the DC bus 204, (ii) configures the power converter 212 to allows sufficient power from the capacitor(s) to flow to DC bus 204 to provide the starting power, and (iii) configures the power converter 202 to convert the DC power on DC bus 204 to AC power on lines 203 to start the motor/generator. In another embodiment, the power controller 201 may couple the battery 1010, in addition to or in lieu of the capacitor 210, to the DC bus 204 to provide the starting power. Once sufficient current is pumped into windings of motor/generator 10, where the motor/generator reaches a self-sustaining operating point, the power controller 201 reverses the direction of the AC/DC converter 202 to boost the motor/generator 10 output voltage and provide a regulated DC bus voltage on DC bus 204.

The battery 1010 may also be used to recharge the capacitor 210 in order to "bootstrap" the system if the capacitor 210 is discharged. The battery 1010 may be controllably coupled across the capacitor 210, via DC/DC converter and/or switch 1012 or power converters 212 and 1022, to charge the capacitor 210.

The system 1000 may include more than one turbine power unit. In such embodiment, each turbine power unit (such as a turbogenerator) may be coupled to the power controller 201 in parallel. The power controller 201 may independently control each turbogenerator to supply AC power, thereby increasing the current drive available for driving the load.

Having now described the invention in accordance with the requirements of the patent statutes, those skilled in this art will understand how to make changes and modifications in the present invention to meet their specific requirements or conditions. For example, the power controller, while described generally, may be implemented in an analog or digital configuration. In the preferred digital configuration, one skilled in the art will recognize that various terms utilized in the invention are generic to both analog and digital configurations of power controller. For example, converters referenced in the present application is a general term which includes inverters, signal processors referenced in the present application is a general term which includes digital signal processors, and so forth. Correspondingly, in a digital implementation of the present invention, inverters and digital signal processors would be utilized. Such changes and modifications may be made without departing from the scope and spirit of the invention as set forth in the following claims.

What is claimed is:

1. A power generation system, comprising:
   a DC bus;
   a turbogenerator including a motor/generator and a turbine coupled to a common shaft, to generate AC power;
   a first power converter coupled to the turbogenerator and the DC bus, to convert the AC power to DC power on the DC bus;
   a second power converter coupled to the DC bus and for coupling to a load, said second power converter converting the DC power on the DC bus to an output power for applying to the load;
   a capacitor coupled to the DC bus to source power to and sink power from the DC bus, due to load changes, to stabilize a DC voltage on the DC bus; and
   a controller coupled to the turbogenerator and the first power converter, the controller regulating a speed of the turbine, independent of the DC voltage on the DC bus.

2. The power generation system of claim 1 wherein the controller is a rotor speed controller.

3. The power generation system of claim 1 further comprising a third power converter coupled between the DC bus and the capacitor to controllably couple the capacitor to the DC bus.

4. The power generation system of claim 1, further comprising:
   a battery coupled to the DC bus.

5. The power generation system of claim 4, further comprising: a fourth power converter coupled between the DC bus and the battery to controllably couple the battery to the DC bus.

6. The power generation system of claim 1, wherein the capacitor is at least one of an electrochemical capacitor and a hybrid capacitor.

7. The power generation system of claim 1, wherein the second power converter comprises a DC/DC power converter to convert the DC voltage on the DC bus to a regulated DC output voltage for applying to the load.

8. The power generation system of claim 1, wherein the second power converter comprises a DC/AC power converter to convert the DC power on the DC bus to an AC output power having a fixed frequency for applying to the load.

9. The power generation system of claim 1, wherein when an increase in power demanded by the load is detected, the capacitor is controllably coupled to the DC bus to source power to the DC bus to meet the increase in power demanded by the load.

10. The power generation system of claim 9, wherein when the increase in power demanded by the load is detected, the power controller increases the speed of the turbine to increase the DC power supplied to the DC bus.

11. The power generation system of claim 10, wherein when a decrease in power demanded by the load is detected, the power controller decreases the speed of the turbine to decrease the DC power supplied to the DC bus.

12. The power generation system of claim 11, wherein the capacitor is controllably coupled to the DC bus to sink excess current on the DC bus.

13. The power generation system of claim 1, wherein the first and second power converters are bi-directional power converters.

14. The power generation system of claim 13, further comprising:
   a battery controllably coupled to the capacitor to charge the capacitor.

15. The power generation system of claim 1, wherein the turbogenerator further comprises:
   a compressor, coupled to the common shaft, that provides a supply of compressed air;
   a combustor fulidly coupled to the compressor that combusts the supply of compressed air and the fuel, and produces exhaust gas; and
   a recuperator fluidly coupled to the combustor that includes a high pressure side, coupled between the compressor and the combustor, and a low pressure side, coupled to receive the exhaust gas after the exhaust gas has passed through the turbine.

16. A power generation system, comprising:
   a fuel source to provide fuel;
   a turbogenerator, coupled to the fuel source, to generate AC power;
   a power controller, electrically coupled to the turbogenerator, including first and second power converters electrically coupled together by a DC bus, wherein the first power converter converts the AC power generated by the turbogenerator to DC power, and the second power converter converts the DC power to an output power for coupling to a load, the power controller regulating the fuel to the turbogenerator, independent of a DC voltage on the DC bus; and
   a battery controllably coupled to the DC bus.

17. The power generation system of claim 16, further comprising:
   a capacitor controllably coupled to the DC bus.

18. The power generation system of claim 17, wherein the capacitor and the battery stabilize the DC voltage on the DC bus during transients.

19. The power generation system of claim 16, further comprising:
   a third power converter coupled between the DC bus and the battery to controllably couple the battery to the DC bus.

20. The power generation system of claim 17, wherein the battery is coupled across the capacitor by a switch.

21. The power generation system of claim 19, wherein the third power converter is a bi-directional power controller.

22. The power generation system of claim 19, further comprising:
a fourth power converter coupled between the DC bus and the capacitor to controllably couple the capacitor to the DC bus.

23. The power generation system of claim 17, wherein the capacitor is at least one of an electrochemical capacitor and a hybrid capacitor.

24. The power generation system of claim 16, wherein the second power converter comprises a DC/DC power converter to convert the DC voltage on the DC bus to a regulated DC output voltage for coupling to the load.

25. The power generation system of claim 16, wherein the second power converter comprises a DC/AC power converter to convert the DC power on the DC bus to an AC output power having a fixed frequency for coupling to the load.

26. The power generation system of claim 17, wherein when an increase in the load is detected, the power controller controllably couples the capacitor to the DC bus to source power to the DC bus to meet the increase in the load.

27. The power generation system of claim 26, wherein when the increase in the load is detected, the power controller increases the fuel to the turbogenerator to increase the DC power supplied to the DC bus.

28. The power generation system of claim 27, wherein when a decrease in the load is detected, the power controller decreases the fuel to the turbogenerator to decrease the DC power supplied to the DC bus.

29. The power generation system of claim 16, wherein the first and second power converters are bi-directional power converters.

30. The power generation system of claim 16, wherein the turbogenerator comprises:
a shaft;
a generator, coupled to the shaft, to generate the AC power;
a compressor, coupled to the shaft, to provide a supply of compressed air;
a combustor, coupled to receive the supply of compressed air and the fuel, to combust the fuel and to provide exhaust gas;
a turbine coupled to the shaft and coupled to receive the exhaust gas, and
a recuperator including a high pressure side, coupled between the compressor and the combustor, and a low pressure side coupled, to receive the exhaust gas from the turbine.

31. The power generation system of claim 30, further comprising:
a temperature sensor, coupled to the power controller and the turbine to sense a temperature, the power controller varying the supply of fuel to the combustor to control the temperature, the control of the temperature being independent of the DC voltage on the DC bus.

32. A power generation system, comprising:
a turbogenerator including a motor/generator and a turbine coupled to a common shaft, the turbogenerator to generate AC power;
first power converter means, coupled to the turbogenerator and a DC bus, for converting the AC power to DC power;
second power converter means, coupled to the DC bus, for converting the DC power to an output power for coupling to a load;
power source means controllably coupled to the DC bus;
capacitor means controllably coupled to the DC bus;
third power converter means, coupled between the capacitor means and the DC bus; and
controller means, coupled to the turbogenerator and the first, second, and third power converter means, for controllably coupling the power source means and the capacitor means to the DC bus to stabilize a DC voltage on the DC bus during transients, and for regulating a speed of the turbogenerator, independent of the DC voltage on the DC bus.

33. The power generation system of claim 32, wherein the power source means is a battery.

34. The power generation system of claim 32, wherein when an increase in the load is detected, the controller means controllably couples the capacitor means to the DC bus to source power to the DC bus to meet the increase in the load.

35. The power generation system of claim 34, wherein when the increase in the load is detected, the power controller means increases the speed of the turbogenerator to increase the DC power supplied to the DC bus.

36. The power generation system of claim 35, wherein when a decrease in power in the load is detected, the power controller means decreases the speed of the turbogenerator to decrease the DC power supplied the DC bus.

37. The power generation system of claim 32, wherein the controller means, in a startup mode, disables the second power converter means to isolate the DC bus from the load, configures the third power converter means to couple the capacitor means to the DC bus and provide a startup DC power to the DC bus, and configures the first power converter means to convert the startup DC power to a startup AC power to start the motor/generator.

38. The power generation system of claim 37, wherein the first, second, and third power converter means are bi-directional power converters.

39. The power generation system of claim 32, wherein the turbogenerator further comprises:
a compressor, coupled to the common shaft, to provide a supply of compressed air;
a combustor to receive the supply of compressed air and fuel, and combust compressed air and fuel to produce exhaust gas; and
a recuperator including a high pressure side, coupled between the compressor and the combustor, and a low pressure side, coupled to receive the exhaust gas after the exhaust gas flows through the turbine.

* * * * *

UNITED STATES PATENT AND TRADEMARK OFFICE
CERTIFICATE OF CORRECTION

PATENT NO. : 6,787,933 B2
DATED : September 7, 2004
INVENTOR(S) : Claude et al.

It is certified that error appears in the above-identified patent and that said Letters Patent is hereby corrected as shown below:

Title page,
Item [12], delete "Claude et al." and insert -- Khalizadeh et al. --.
Item [75], Inventors, delete "Khalizadeh Claude" and insert -- Claude Khalizadeh --; delete "San Ramone" and insert -- San Ramon --; and delete "Wacknov Joel" and insert -- Joel Wacknov --.
Item [56], References Cited, U.S. PATENT DOCUMENTS, add
-- 6,323,625 Bhargava --.

Column 33,
Line 29, insert -- , -- after "turbogenerator".
Line 35, replace "said" with -- the --.
Lines 45 and 47, insert -- , -- after "claim 1".
Line 48, insert -- : -- after "comprising".

Column 34,
Lines 11 and 15, delete "power" before "controller".
Line 31, replace "fulidly" with -- fluidly --.
Line 32, delete "the" before "fuel".

Column 36,
Lines 32 and 36, delete "power" before "controller".
Line 36, delete "in power" before "in the load";
Line 37, insert -- to -- after "supplied".

Signed and Sealed this

Twenty-second Day of February, 2005

JON W. DUDAS
*Director of the United States Patent and Trademark Office*